US006557506B2

(12) United States Patent
Sturman

(10) Patent No.: US 6,557,506 B2
(45) Date of Patent: *May 6, 2003

(54) HYDRAULICALLY CONTROLLED VALVE FOR AN INTERNAL COMBUSTION ENGINE

(75) Inventor: Oded E. Sturman, Woodland Park, CO (US)

(73) Assignee: Sturman Industries, Inc., Woodland Park, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/978,998

(22) Filed: Oct. 15, 2001

(65) Prior Publication Data

US 2002/0023626 A1 Feb. 28, 2002

Related U.S. Application Data

(62) Division of application No. 08/712,208, filed on Sep. 11, 1995, now Pat. No. 6,308,690, which is a continuation-in-part of application No. 08/788,505, filed on Jan. 24, 1997, now abandoned, which is a continuation of application No. 08/223,440, filed on Apr. 5, 1994, now Pat. No. 5,640,987.

(51) Int. Cl.⁷ .................................................. F01L 9/02
(52) U.S. Cl. ................................. 123/90.12; 123/90.13
(58) Field of Search ...................... 123/90.12, 90.11, 123/446, 90.13, 508, 509; 251/129.1, 129.09

(56) References Cited

U.S. PATENT DOCUMENTS

| 4,200,067 A | 4/1980 | Trenne |
|---|---|---|
| 4,206,728 A | 6/1980 | Trenne |
| 4,715,330 A | 12/1987 | Buchl |
| 4,715,332 A | 12/1987 | Kreuter |
| 4,721,075 A | 1/1988 | Kasai |
| 4,785,787 A | 11/1988 | Riszk |
| 4,791,895 A | 12/1988 | Tittizer |
| 4,899,700 A | 2/1990 | Richeson, Jr. et al. |
| 5,022,358 A | 6/1991 | Richeson |
| 5,058,857 A | 10/1991 | Hudson |
| 5,117,790 A | 6/1992 | Clarke et al. |
| 5,125,370 A | 6/1992 | Kawamura |
| 5,125,807 A | 6/1992 | Kohler |
| 5,224,683 A | * 7/1993 | Richeson ................. 251/30.01 |
| 5,237,968 A | 8/1993 | Miller et al. |
| 5,237,976 A | 8/1993 | Lawrence |
| 5,248,123 A | 9/1993 | Richeson et al. |
| 5,255,641 A | 10/1993 | Schechter |
| 5,287,829 A | * 2/1994 | Rose ........................ 123/90.12 |
| 5,335,633 A | * 8/1994 | Thien ....................... 123/90.12 |
| 5,339,777 A | * 8/1994 | Cannon .................... 123/90.12 |
| 5,341,787 A | 8/1994 | Zabek |
| 5,445,129 A | 8/1995 | Barnes |
| 5,622,152 A | 4/1997 | Ishida |
| 5,713,316 A | * 2/1998 | Sturman ................... 123/90.12 |
| 6,308,690 B1 | * 10/2001 | Sturman ..................... 123/508 |

OTHER PUBLICATIONS

Michael M. Schechter and Michael B. Levin, Ford Research Lab, "Camless Engine," SAE Technical Paper Series 960581, Feb. 26–29, 1996, pp. 17–30, International Congress & Exposition, Detroit, Michigan.

* cited by examiner

Primary Examiner—Carl S. Miller
(74) Attorney, Agent, or Firm—Blakely, Sokoloff, Taylor & Zafman LLP

(57) ABSTRACT

A valve assembly adapted for an internal combustion engine, including a valve housing having a pressure chamber. A piston seperates the pressure chamber into a first subchamber and a second subchamber. A first port is coupled the first subchamber and a second port is coupled to the second subchamber. A valve is coupled to the piston and moveable between an open position and a closed position. The valve is moved from the closed position to the open position by supplying a high pressure working fluid to the first port and coupling the second port to a drain. The valve is moved from the open position to the closed position by supplying the high pressure working fluid to the second port and coupling the first port to the drain.

30 Claims, 15 Drawing Sheets

HYDRAULICALLY CONTROLLED VALVE FOR AN INTERNAL COMBUSTION ENGINE

CROSS REFERENCE TO RELATED APPLICATIONS

This is a divisional application of U.S. application Ser. No. 08/712,208, filed Sep. 11, 1995 now U.S. Pat. No. 6,308,690, which is a continuation-in-part of application Ser. No. 08/788,505, filed Jan. 24, 1997, abandoned, which is a continuation of application Ser. No. 08/223,440, filed Apr. 5, 1994, now U.S. Pat. No. 5,640,987.

FIELD OF THE INVENTION

The present invention relates to a microprocessor controlled camless internal combustion engine that contains a plurality of digitally latched solenoid control valves that control a number of hydraulically driven valves and fuel injectors.

BACKGROUND OF THE INVENTION

Conventional compression ignition engines contain cams that coordinate the timing of the intake and exhaust valves with the pistons and fuel injectors of the engine. Cams are subject to wear which may affect the timing of the valves. Additionally, cams are not readily susceptible to changes in the valve timing.

U.S. Pat. No. 5,125,370 issued to Kawamura; U.S. Pat. No. 4,715,330 issued to Buchl and U.S. Pat. No. 4,715,332 issued to Kreuter disclose various camless solenoid actuated intake and exhaust valves. The valve stems are magnetically coupled to the solenoids which move the valves between open and closed positions. The mass and inertia of the intake/exhaust valves require energy to move the valves. This power requirement reduces the energy efficiency of the engine. Additionally, the response time for opening and closing the valves is relatively slow, thereby reducing the control of the valve.

U.S. Pat. No. 5,248,123, 5,022,358 and 4,899,700 issued to Richeson; U.S. Pat. No. 4,791,895 issued to Tittizer and U.S. Pat. No. 5,255,641 issued to Schechter all disclose hydraulically driven intake/exhaust valves. The hydraulic fluid is typically controlled by a solenoid control valve. The solenoid control valves described and used in the prior art require a constant supply of power to maintain the valve in an actuating position. The constant supply of power again consumes more energy from the engine. Additionally, the solenoid control valves of the prior art have been found to be relatively slow thus restricting the accuracy of the valve timing.

U.S. Pat. Nos. 4,200,067 and 4,206,728 issued to Trenne; and U.S. Pat. No. 5,237,968 issued to Miller et al. disclose hydraulic systems that control the injection of fuel and the timing of valves. These systems incorporate a cam or spool that controls the working fluid which drives the fuel injector and the valves. The components are coupled together so that fuel injection and valve movement always occur in the same time sequence. It sometimes desirable to vary the movement and timing of the fuel injector and the valves. For example, when decelerating a vehicle, it is desirable to brake the engine by allowing the pistons to continually compress air during the power strokes of the engine, an engine mode commonly referred to as Jake braking. Jake braking requires a cessation of fuel injection during the expansion stroke of a CI engine. Additionally, the exhaust valve is typically slightly opened when the piston reaches top dead center of the compression stroke.

U.S. Pat. No. 5,117,790 issued to Clarke et al. discloses a valve/fuel injection system which contains a separate actuator for each valve and fuel injector of the engine. The actuators are controlled by a central microprocessor. The Clarke system is thus capable of running the engine in different modes such as Jake braking. Clarke is silent as to the actual implementation of the actuators and the valves that control the actuators. It is not apparent whether Clarke provides a responsive, energy efficient camless engine that can operate in a variety of modes. It would be desirable to provide an accurate, responsive, energy efficient camless internal combustion engine than can operate in different modes.

Fuel injectors of the prior art typically contain an hydraulically driven intensifier that increases the pressure of the fuel that is ejected into the internal combustion chamber. The hydraulic fluid is provided by a pump that is driven by the engine. To compensate for variations in engine temperature, rpm's, and other factors the hydraulic system typically contains a pressure relief valve that opens when the rail pressure exceeds a predetermined value. The pressure relief valve contains a spring that biases the valve into a closed position. The pump must generate work to overcome the force of the spring during a by-pass cycle. The additional work increases the frictional horsepower and reduces the fuel efficiency of the engine. It would be desirable to provide a hydraulic by-pass system that would not require work from the pump.

SUMMARY OF THE INVENTION

The present invention is an internal combustion engine that contains a controller which controls different components such as a fuel injector, an exhaust valve and a by-pass valve of a pump with digital control signals. The engine may have an hydraulically driven fuel injector which ejects a volume of fuel into an internal combustion chamber. The flow of air into the internal combustion chamber and the flow of exhaust gas out of the chamber may be controlled by camless hydraulically driven intake and exhaust valves. The hydraulic actuation of the fuel injector and valves are controlled by solenoid actuated latching fluid control valves. The operation of the injector and the valves is controlled by a controller which provides digital signals to actuate and latch the solenoid control valves. The digital signals consume minimal power and actuate the valves at relatively high speeds. The engine further contains a pump that pumps the hydraulic fluid to the control valves. The pump system contains an hydraulically driven solenoid actuated latching by-pass valve which can be opened to couple the outlet of the pump with a return line. Latching the by-pass valve into an open position allows the output of the pump to be dumped to the return line without requiring additional work from the pump to maintain the by-pass valve in the open position. The by-pass valve can be opened by a digital control signal from the controller. The controller can open and close the by-pass valve to control the rail pressure provided to the control valves.

DETAILED DESCRIPTION OF THE INVENTION

Figure 1:
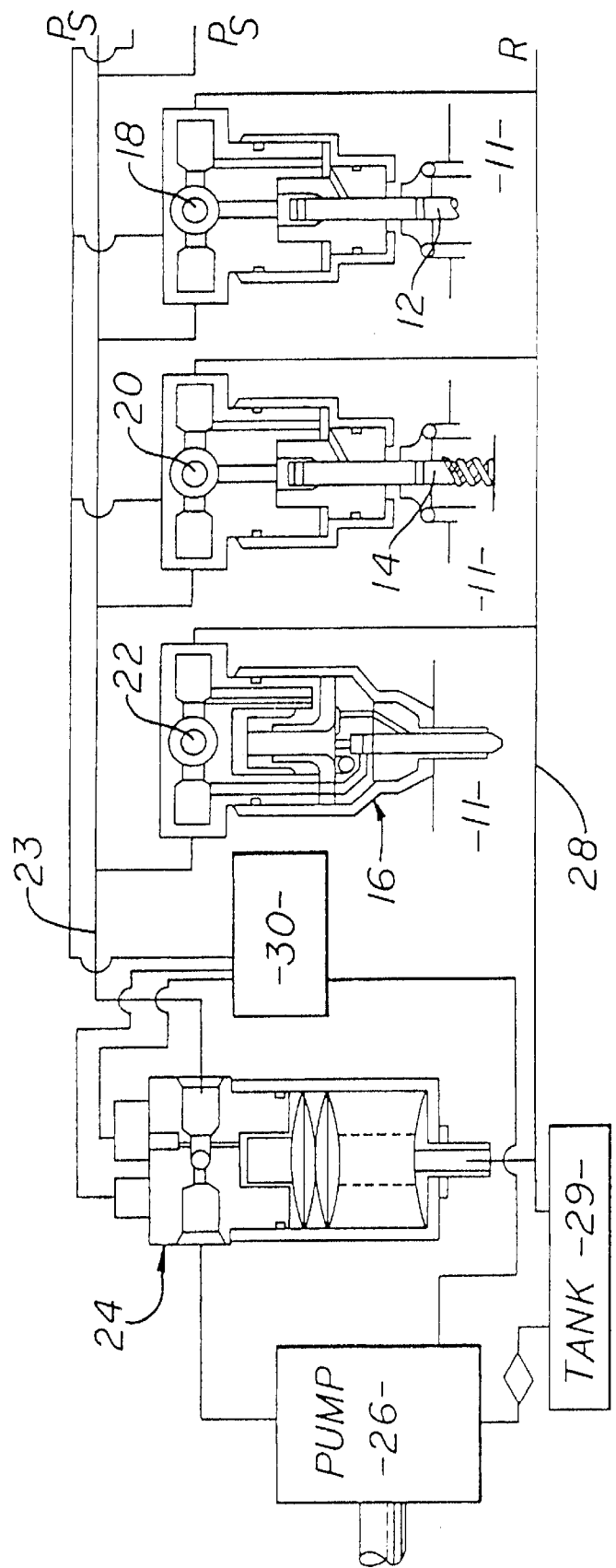
FIG. 1 is a schematic of a camless valve/injector system.

Referring to the drawings more particularly by reference numbers, FIG. 1 shows a camless valve/injector system 10 of the present invention. The system 10 is typically incorporated into a compression ignition (CI) engine, although it is to be understood that the system can be used in a spark ignition engine. The engine contains a number of pistons (not shown) that move within internal combustion chambers 11 as is known in the art. The engine is typically a four-stroke engine which operates through conventional intake, compression, power and exhaust strokes of the pistons. Although a four-stroke engine is described, it is to be understood that the system 10 can be used in a two-stroke engine.

Each internal combustion chamber 11 has a corresponding intake valve 12, an exhaust valve 14 and a fuel injector 16. The valves 12 and 14 are hydraulically driven by a pressurized working fluid. The fuel injector 16 is actuated by the working fluid to inject a pressurized spray of fuel into the cylinders of the engine. The flow of working fluid required to move the intake and exhaust valves is controlled by a first solenoid actuated fluid control valve 18 and a second solenoid actuated fluid control valve 20, respectively. The fuel injector is controlled by a third solenoid control valve 22. Although only one set of valves, etc. is shown and described, it is to be understood that each cylinder in a multiple cylinder engine will have a corresponding set of valves and an injector.

The control valves 18–22 each have an inlet port that is coupled to a high pressure working fluid line 23. The high pressure line 23 is coupled to an accumulator 24 and a pump 26. The control valves 18–22 also have outlet ports that are coupled to a low pressure return line 28. The low pressure line 28 is connected to a tank 29. The pump increases the pressure of the working fluid to a desired level. The accumulator 24 can control the pressure within the high pressure line 23. The working fluid may be the engine fuel or a separate hydraulic fluid.

The control valves 18–22 are also connected to an electronic controller 30 which provides a plurality of digital pulses to actuate the valves 18–22. The control valves 18–22 each contain a pair of solenoids that latch the valve into one of two positions to direct the flow of working fluid. The valves are constructed from a magnetic material which will contain a enough residual magnetism to maintain the position of the valve even when power is not provided to the solenoids. By way of example, to open a valve the controller provides an active digital signal to one of the solenoids. When the signal is driven low, the hysteresis of the valve maintains the valve in the open position. The valve can be closed by providing a second active digital signal to the other solenoid. In accordance with the present invention a digital pulse is a signal of a short duration. For example, the signal may have a duration of 200 microseconds. The short duration digital pulse is to be distinguished from power signals for solenoid of the prior art, wherein a valve is maintained in a position by continuously supplying power to one of the solenoids.

Figure 2:
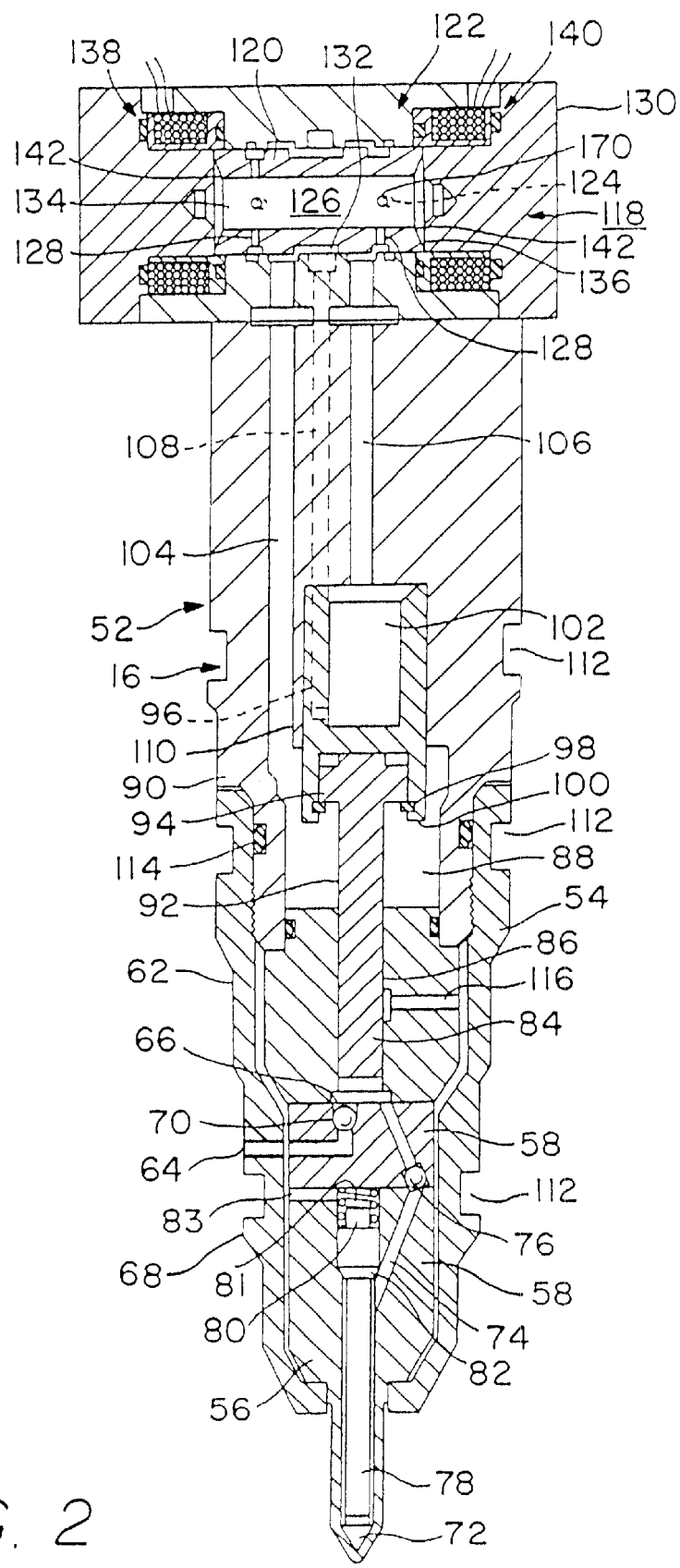
FIG. 2 is a cross-sectional view of a fuel injector with a four-way control valve that has a spool valve in a first position.

As shown in FIG. 2, each fuel injector 10 has an injector housing 52 that is typically constructed from a plurality of individual parts. The housing 52 includes an outer casing 54 that contains block members 56, 58, and 60. The outer casing 54 has a fuel port 64 that is coupled to a fuel pressure chamber 66 by a fuel passage 68. A first check valve 70 is located within fuel passage 68 to prevent a reverse flow of fuel from the pressure chamber 66 to the fuel port 64. The pressure chamber 26 is coupled to a nozzle 72 through fuel passage 74. A second check valve 76 is located within the fuel passage 74 to prevent a reverse flow of fuel from the nozzle 72 to the pressure chamber 66.

The flow of fuel through the nozzle 72 is controlled by a needle valve 78 that is biased into a closed position by spring 80 located within a spring chamber 81. The needle valve 78 has a shoulder 82 above the location where the passage 74 enters the nozzle 78. When fuel flows into the passage 74 the pressure of the fuel applies a force on the shoulder 82. The shoulder force lifts the needle valve 78 away from the nozzle openings 72 and allows fuel to be discharged from the injector 50.

A passage 83 may be provided between the spring chamber 81 and the fuel passage 68 to drain any fuel that leaks into the chamber 81. The drain passage 83 prevents the build up of a hydrostatic pressure within the chamber 81 which could create a counteractive force on the needle valve 78 and degrade the performance of the injector 10.

The volume of the pressure chamber 66 is varied by an intensifier piston 84. The intensifier piston 84 extends through a bore 86 of block 60 and into a first intensifier chamber 88 located within an upper valve block 90. The piston 84 includes a shaft member 92 which has a shoulder 94 that is attached to a head member 96. The shoulder 94 is retained in position by clamp 98 that fits within a corresponding groove 100 in the head member 96. The head member 96 has a cavity which defines a second intensifier chamber 102.

The first intensifier chamber 88 is in fluid communication with a first intensifier passage 104 that extends through block 90. Likewise, the second intensifier chamber 102 is in fluid communication with a second intensifier passage 106.

The block 90 also has a supply working passage 108 that is in fluid communication with a supply working port 110. The supply port is typically coupled to a system that supplies a working fluid which is used to control the movement of the intensifier piston 84. The working fluid is typically a hydraulic fluid that circulates in a closed system separate from the fuel. Alternatively the fuel could also be used as the working fluid. Both the outer body 54 and block 90 have a number of outer grooves 112 which typically retain O-rings (not shown) that seal the injector 16 against the engine block. Additionally, block 62 and outer shell 54 may be sealed to block 90 by O-ring 114.

Block 60 has a passage 116 that is in fluid communication with the fuel port 64. The passage 116 allows any fuel that leaks from the pressure chamber 66 between the block 62 and piston 84 to be drained back into the fuel port 64. The passage 116 prevents fuel from leaking into the first intensifier chamber 88.

The flow of working fluid into the intensifier chambers 88 and 102 can be controlled by a four-way solenoid control valve 118. The control valve 18 has a spool 120 that moves within a valve housing 122. The valve housing 122 has openings connected to the passages 104, 106 and 108 and a drain port 124. The spool 120 has an inner chamber 126 and a pair of spool ports that can be coupled to the drain ports 124. The spool 120 also has an outer groove 132. The ends of the spool 120 have openings 134 which provide fluid communication between the inner chamber 126 and the valve chamber 134 of the housing 122. The openings 134 maintain the hydrostatic balance of the spool 120.

Figure 3:
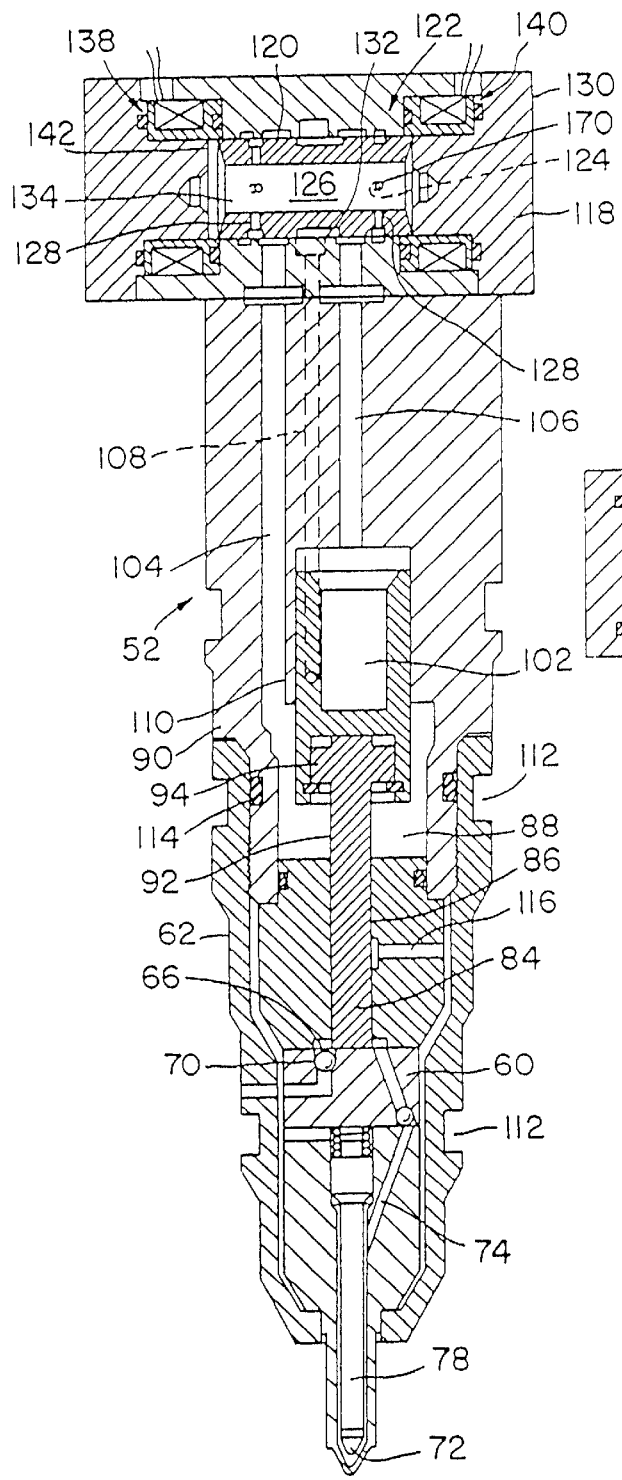
FIG. 3 is a cross-sectional view of the fuel injector with the spool valve in a second position.

The valve spool 120 is moved between the first position shown in FIG. 2 and a second position shown in FIG. 3, by a first solenoid 138 and a second solenoid 140. The solenoids 138 and 140 are typically coupled to a controller which controls the operation of the injector. When the first solenoid 138 is energized, the spool 120 is pulled to the first position, wherein the first groove 132 allows the working fluid to flow from the supply working passage 108 into the first intensifier chamber 88, and the fluid flows from the second intensifier chamber 102 into the inner chamber 126 and out the drain port 124. When the second solenoid 140 is energized the spool 120 is pulled to the second position, wherein the first groove 132 provides fluid communication between the supply working passage 108 and the second intensifier chamber 102, and between the first intensifier chamber 88 and the drain port 124.

The groove 132 and passages 128 are preferably constructed so that the initial port is closed before the final port is opened. For example, when the spool 120 moves from the first position to the second position, the portion of the spool adjacent to the groove 132 initially blocks the first passage 104 before the passage 128 provides fluid communication between the first passage 104 and the drain port 124. Delaying the exposure of the ports, reduces the pressure surges in the system and provides an injector which has more predictable firing points on the fuel injection curve.

The spool 120 typically engages a pair of bearing surfaces 142 in the valve housing 122. Both the spool 120 and the housing 122 are preferably constructed from a magnetic material such as a hardened 52100 or 440c steel, so that the hysteresis of the material will maintain the spool 120 in either the first or second position. The hysteresis allows the solenoids to be de-energized after the spool 120 is pulled into position. In this respect the control valve operates in a digital manner, wherein the spool 120 is moved by a defined pulse that is provided to the appropriate solenoid. Operating the valve in a digital manner reduces the heat generated by the coils and increases the reliability and life of the injector.

In operation, the first solenoid 138 is energized and pulls the spool 120 to the first position, so that the working fluid flows from the supply port 110 into the first intensifier chamber 88 and from the second intensifier chamber 102 into the drain port 124. The flow of working fluid into the intensifier chamber 88 moves the piston 84 and increases the volume of chamber 66. The increase in the chamber 66 volume decreases the chamber pressure and draws fuel into the chamber 66 from the fuel port 64. Power to the first solenoid 138 is terminated when the spool 120 reaches the first position.

When the chamber 66 is filled with fuel, the second solenoid 140 is energized to pull the spool 120 into the second position. Power to the second solenoid 140 is terminated when the spool reaches the second position. The movement of the spool 120 allows working fluid to flow into the second intensifier chamber 102 from the supply port 110 and from the first intensifier chamber 88 into the drain port 124.

The head 96 of the intensifier piston 96 has an area much larger than the end of the piston 84, so that the pressure of the working fluid generates a force that pushes the intensifier piston 84 and reduces the volume of the pressure chamber 66. The stroking cycle of the intensifier piston 84 increases the pressure of the fuel within the pressure chamber 66. The pressurized fuel is discharged from the injector through the nozzle 72. The fuel is typically introduced to the injector at a pressure between 1000–2000 psi. In the preferred embodiment, the piston has a head to end ratio of approximately 10:1, wherein the pressure of the fuel discharged by the injector is between 10,000–20,000 psi.

After the fuel is discharged from the injector the first solenoid 138 is again energized to pull the spool 120 to the first position and the cycle is repeated. It has been found that the double solenoid spool valve of the present invention provide a fuel injector which can more precisely discharge fuel into the combustion chamber of the engine than injectors of the prior art.

Figure 4:
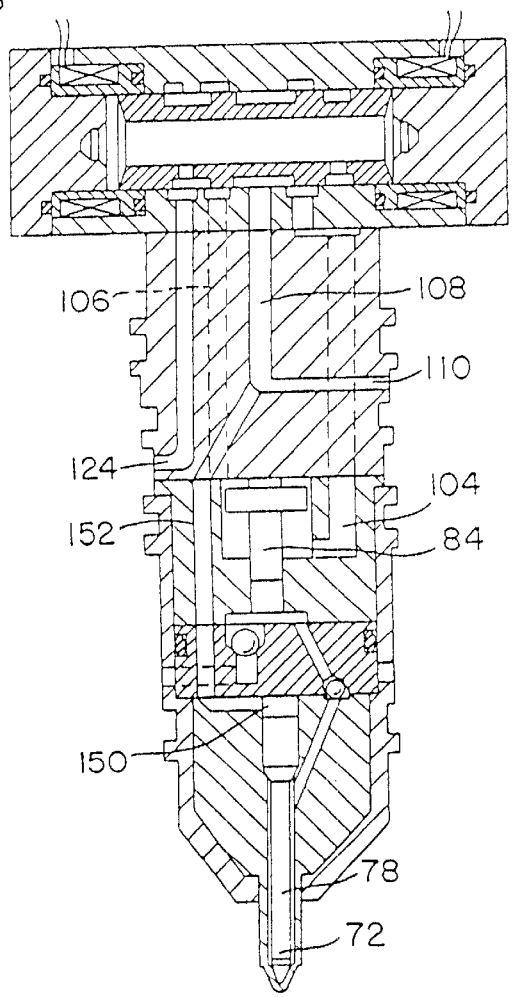
FIG. 4 is an alternate embodiment of the fuel injector of FIG. 3.

FIG. 4 shows an alternate embodiment of a fuel injector of the present invention which does not have a return spring for the needle valve. In this embodiment the supply working passage 108 is coupled to a nozzle return chamber 150 by passage 152. The needle valve 78 is biased into the closed position by the pressure of the working fluid in the return chamber 150. When the intensifier piston 84 is stroked, the pressure of the fuel is much greater than the pressure of the working fluid, so that the fuel pressure pushes the needle valve 78 away from the nozzle openings 72. When the intensifier piston 84 returns to the original position, the pressure of the working fluid within the return chamber 150 moves the needle valve 78 and closes the nozzle 72.

Figure 5:
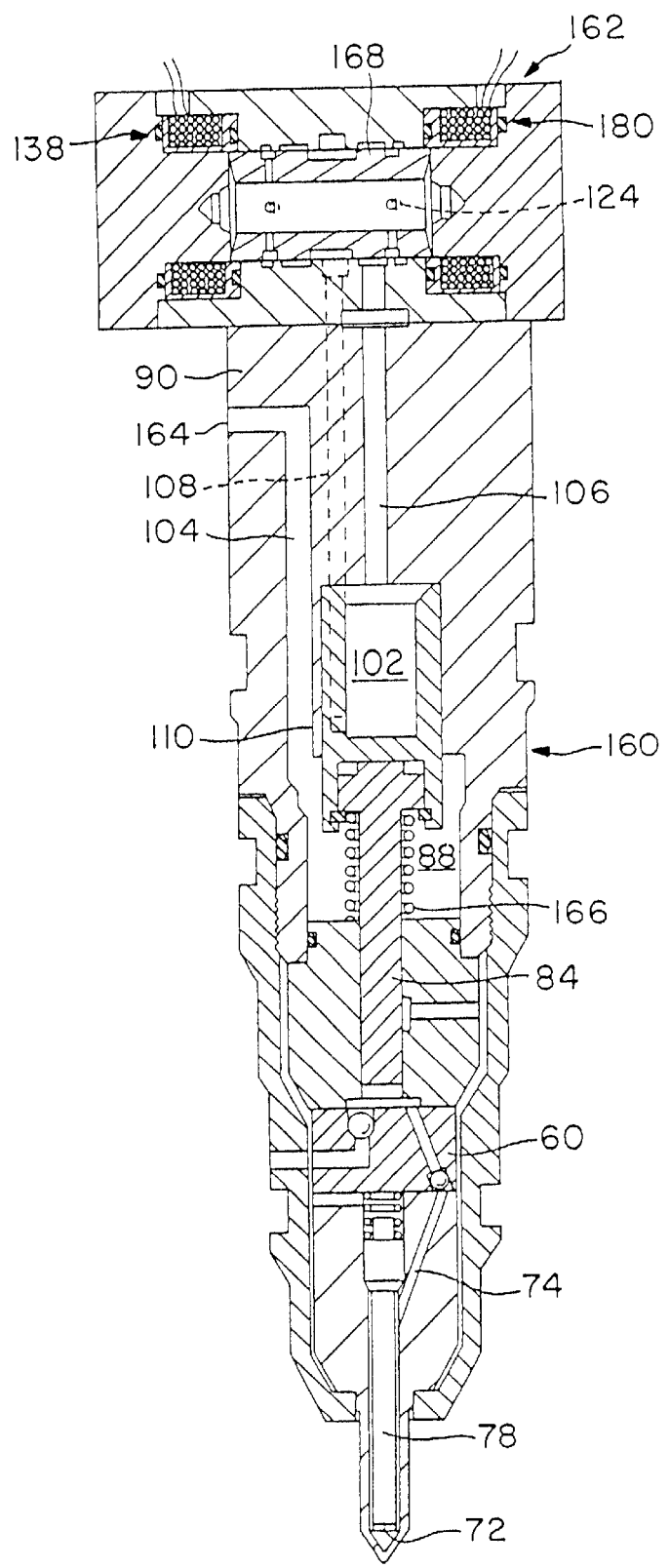
FIG. 5 is a cross-sectional view of an alternate embodiment of a fuel injector which has a three-way control valve.

FIG. 5 shows an injector 160 controlled by a three-way control valve 162. In this embodiment, the first passage 108 is connected to a drain port 164 in block 90, and the intensifier piston 84 has a return spring 166 which biases the piston 84 away from the needle valve 78. Movement of the spool 168 provides fluid communication between the second passage 106 and either the supply port 110 or the drain port 124.

When the spool 168 is in the second position, the second passage 106 is in fluid communication with the supply passage 108, wherein the pressure within the second intensifier chamber 102 pushes the intensifier piston 84 and pressurized fuel is ejected from the injector 160. The fluid within the first intensifier chamber 88 flows through the drain port 164 and the spring 166 is deflected to a compressed state. When the spool 168 is pulled by the first solenoid 138 back to the first position, the second passage 106 is in fluid communication with the drain port 124 and the second intensifier chamber 102 no longer receives pressurized working fluid from the supply port 110. The force of the spring 166 moves the intensifier piston 84 back to the original position. The fluid within the second intensifier chamber 102 flows through the drain port 124.

Both the three-way and four-way control valves have inner chambers 126 that are in fluid communication with the valve chamber 132 through spool openings 134, and the drain ports 124 through ports 130. The ports inner chamber and openings insure that any fluid pressure within the valve chamber is applied equally to both ends of the spool. The equal fluid pressure balances the spool so that the solenoids do not have to overcome the fluid pressure within the valve chamber when moving between positions. Hydrostatic pressure will counteract the pull of the solenoids, thereby requiring more current for the solenoids to switch the valve. The solenoids of the present control valve thus have lower power requirements and generate less heat than injectors of the prior art, which must supply additional power to overcome any hydrostatic pressure within the valve. The balanced spool also provides a control valve that has a faster response time, thereby increasing the duration interval of the maximum amount of fuel emitted by the injector. Increasing the maximum fuel duration time provides a fuel injection curve that is more square and more approximates an ideal curve.

As shown in FIG. 2, the ends of the spool 120 may have concave surfaces 170 that extend from an outer rim to openings 134 in the spool 120. The concave surfaces 170 function as a reservoir that collects any working fluid that leaks into the gaps between the valve housing 122 and the end of the spool. The concave surfaces significantly reduce any hydrostatic pressure that may build up at the ends of the spool 120. The annular rim at the ends of the spool 120 should have an area sufficient to provide enough hysteresis between the spool and housing to maintain the spool in position after the solenoid has been de-energized.

Figure 6:
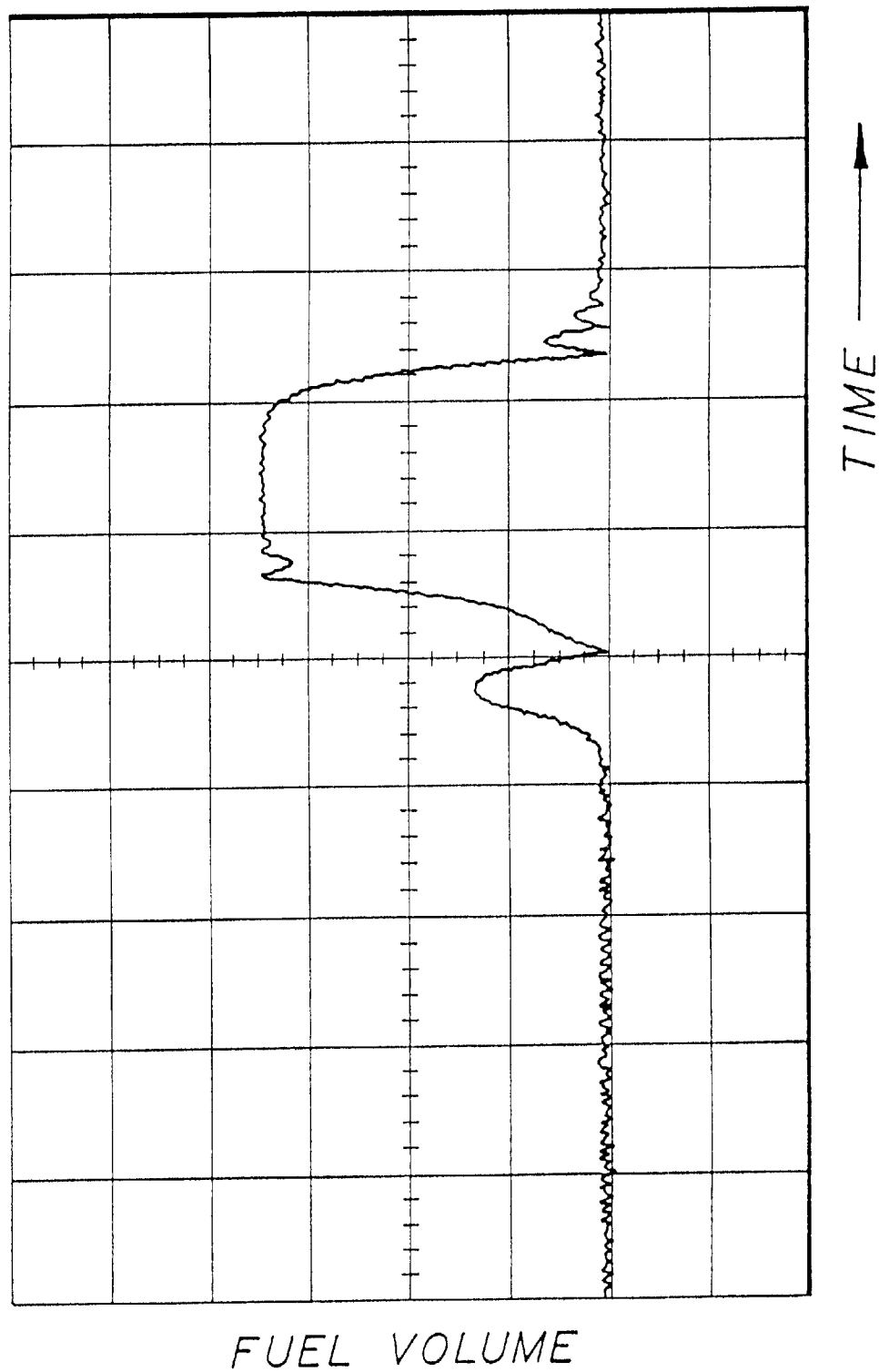
FIG. 6 is a graph showing a fuel injection curve.

FIG. 6 shows a fuel injection curve generated by the fuel injector of the present invention. A pre-injection of fuel is initially ejected into the combustion chamber. After a pre-determined time delay, the final injection of fuel is provided to the combustion chamber. The hydraulically driven digitally controlled fuel injector of the present invention has been found to provide a more ideal fuel injection curve than fuel injectors of the prior art.

Figure 7:
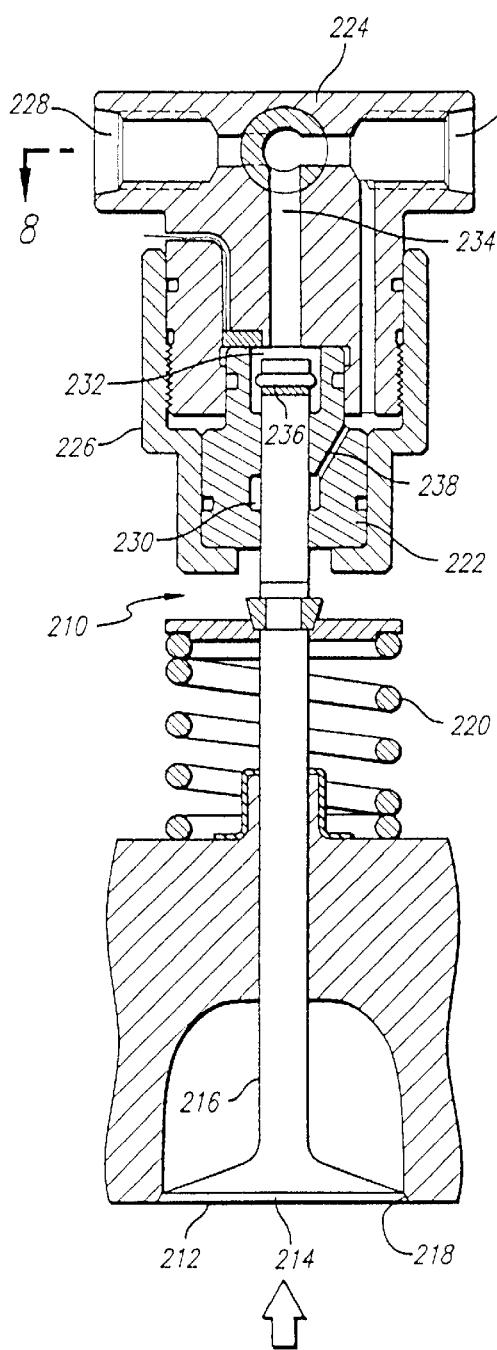
FIG. 7 is a cross-sectional view of a camless intake valve of the present invention.

FIG. 7 shows a valve assembly 12 of the present invention. The valve assembly 12 is typically incorporated into an internal combustion engine as either an intake or exhaust valve. The assembly 10 has a valve 212 that includes a seat 214 located at the end of a valve stem 216. The seat 214 is located within an opening 218 in the internal combustion chamber of the engine. The valve 212 can move between an open position and a closed position. The assembly 10 may include a spring 20 that biases the valve 12 into the closed position. Although an intake valve 12 is shown and described, the following description is also applicable to an exhaust valve.

The assembly 12 may include a barrel 222 that is coupled to a valve housing 224 by an outer shell 226. The valve housing 224 has a first port 228 that is connected to a pressurized working fluid.

For example, the first port 228 may be coupled to the output line of a pump (not shown). The housing 224 also has a second port 230 connected to a low pressure line. For example, the second port 230 may be coupled to a reservoir of the working fluid system. The working fluid may be engine fuel or a separate hydraulic fluid.

The barrel 222 has a pressure chamber 232 that is coupled to a first passage 234 in the valve housing 224. The end of the valve stem 216 is located within the pressure chamber 232. When a high pressure working fluid is introduced to the chamber 232, the resultant fluid force pushes the stem 216 and the valve 212 into the open position. The stem 216 may have a stop 236 that limits the travel of the valve 212. The barrel 222 and valve housing 224 may have a drain passage 238 in fluid communication with the second port 230. The passage 238 drains any working fluid that leaks between the stem and the barrel back to the system reservoir.

Figure 8:
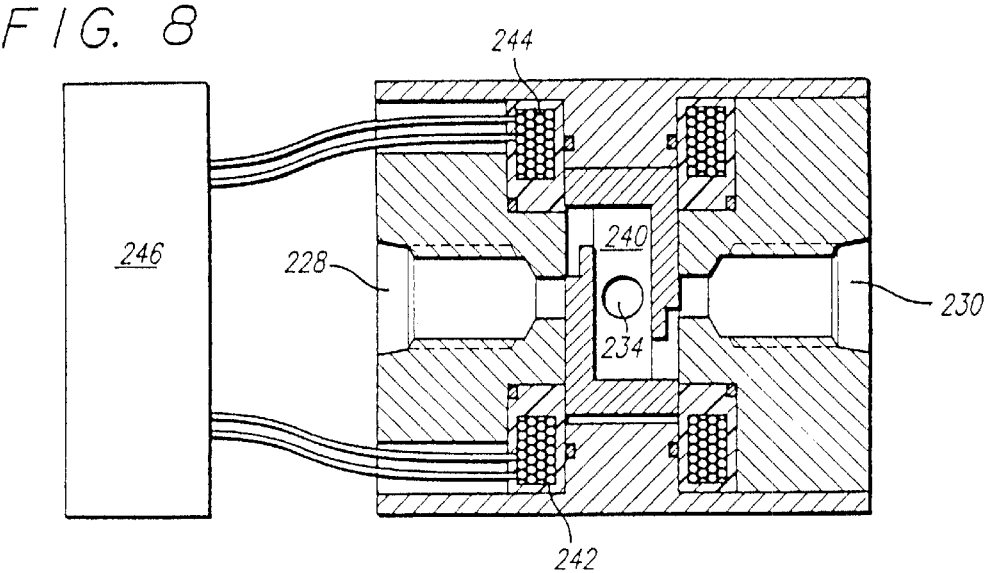
FIG. 8 is a side cross-sectional view showing the solenoid control valve of the intake valve.

As shown in FIG. 8, the assembly has a spool 240 that is coupled to a first solenoid 242 and a second solenoid 244. The flow of working fluid through the passage 234, and ports 228 and 230 are controlled by the position of the spool 240. When the first solenoid 242 is energized, the spool 240 is moved into a first position, wherein the first port 228 is in fluid communication with the pressure chamber 232. When the second solenoid 244 is energized, the spool 240 is moved to a second position, wherein the second port 230 is in fluid communication with the pressure chamber 232.

The solenoids 242 and 244 are connected to a microcontroller 246 that controls the operation of the valve. The controller 246 energizes each solenoid with a short digital pulse. The spool 240 and valve housing 224 are preferably constructed from a magnetic material such as a 52100 or 440c hardened steel. The magnetic material has a hysteresis which will maintain the spool 240 in position even after power to the solenoid is terminated. The spool 240 is moved to a new position by energizing one solenoid with a short duration digital pulse. There is no power provided to the solenoid to maintain the position of the spool 240. The residual magnetism will maintain the position of the spool 240.

Figure 9:
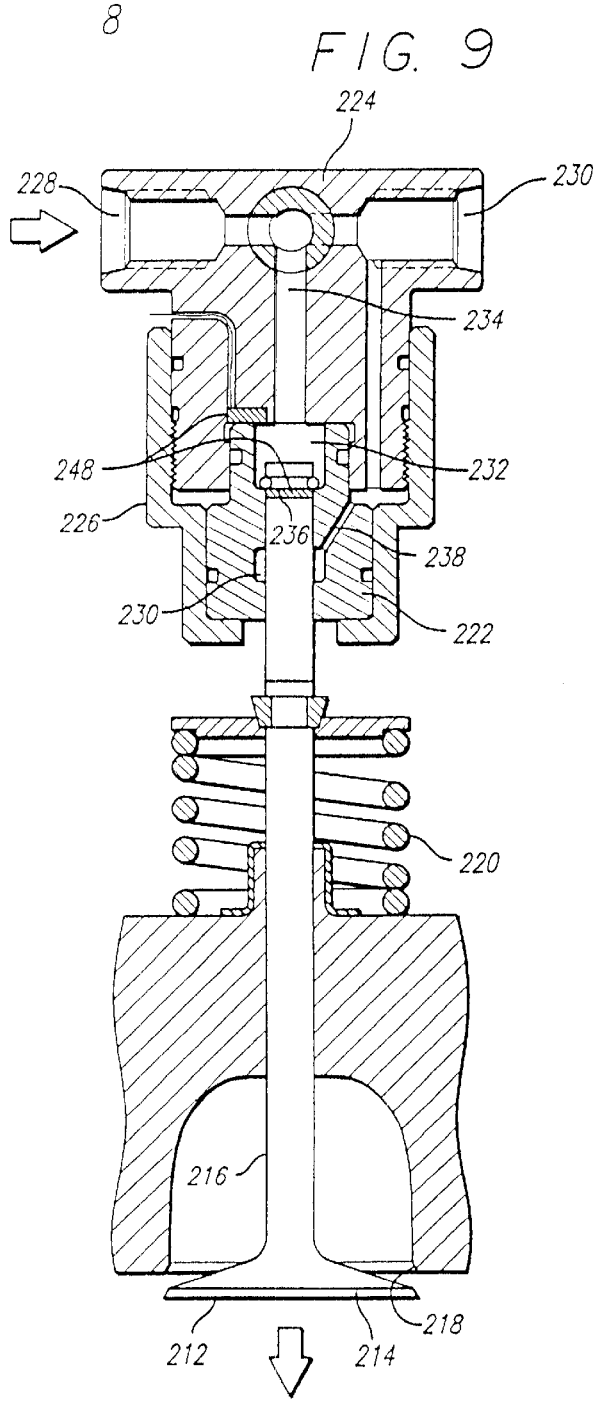
FIG. 9 is a cross-sectional view of the intake valve in an open position.

In operation, to open the valve 212, the controller 246 energizes the first solenoid 242 and moves the spool 240 to the first position. Movement of the spool 240 couples the high pressure first port 228 with the pressure chamber 232, wherein the high pressure working fluid pushes the valve 212 into the open position as shown in FIG. 9. To close the valve, the controller 246 provides a digital pulse to the second solenoid 244 to move the spool 240 to the second position and couple the pressure chamber 232 to the return line of the second port 230. The spring 220 moves the valve 212 back into the closed position.

The assembly 12 may have a sensor 248 that is coupled to the valve 212. The sensor 248 provides an indication on the position of the valve 212. The sensor 248 may be a Hall Effect sensor which provides an output voltage that varies with the distance from the valve stem to the sensing device. The sensor 248 provides feedback so that the controller 246 can accurately open and close the valve. Additionally, it may be desirable to move the valve to a location between the open and closed positions. For example, when braking an engine it is typically desirable to maintain the exhaust valve in a slightly open position during the power stroke of the engine. The controller 246 can move the spool 240 between the first and second positions so that the valve is in an intermediate position.

Figure 10:
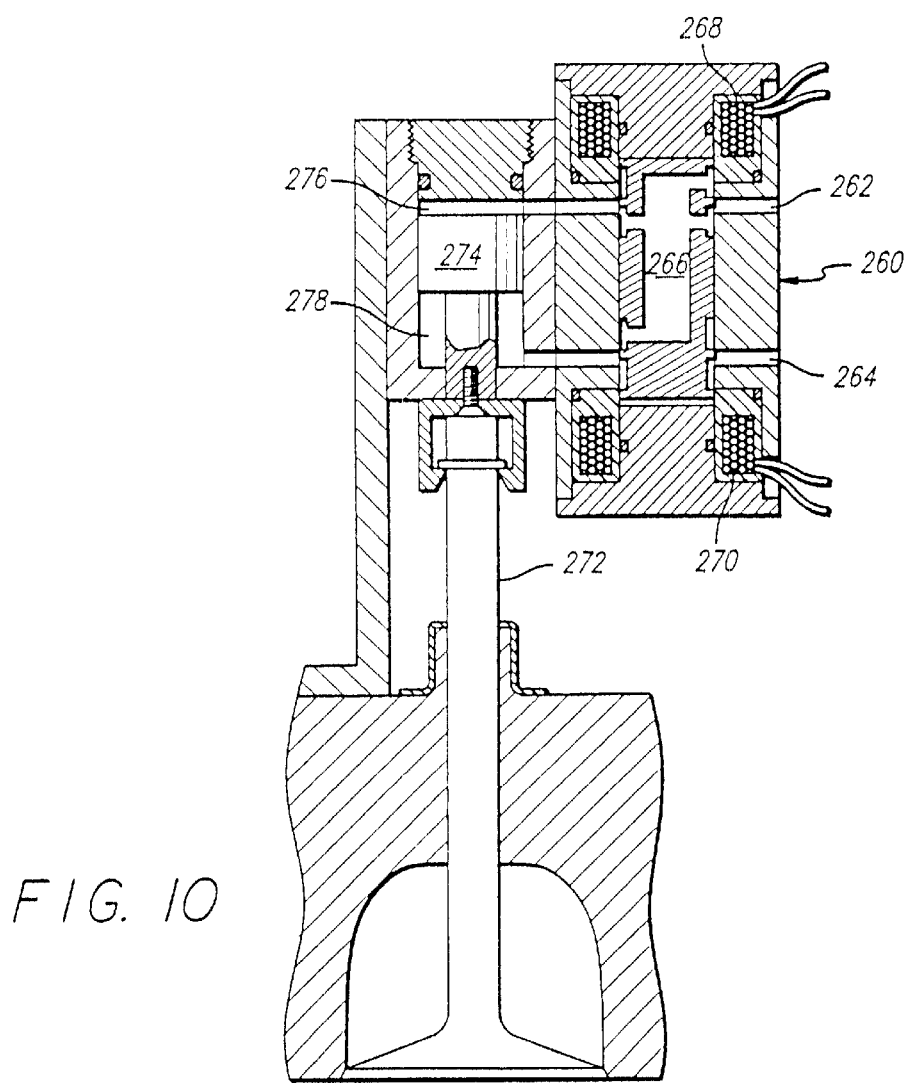
FIG. 10 is a cross-sectional view of an alternate embodiment of an intake valve with a four-way solenoid control valve.

FIG. 10 shows an alternate embodiment of an assembly that does not have a spring 220 and utilizes a digitally latched four-way control valve 260. The valve 260 has a supply port 262 and a return port 264. The valve 260 contains a spool 266 that is controlled by solenoids 268 and 270. The valve stem 272 has a piston 274 that creates a first subchamber 276 and a second subchamber 278. When the spool 262 is in the first position, the supply port 262 is in fluid communication with the first subchamber 276 and the return port 264 is in fluid communication with the second subchamber 278, wherein the high pressure working fluid pushes the valve into the open position. When the spool 260 is moved into the second position the supply port 262 is in fluid communication with the second subchamber 278 and the return port 264 is in fluid communication with the first subchamber 276, wherein the high pressure working fluid within the second subchamber 278 pushes the valve back to the closed position. Generally speaking, the four-way valve provides a more accurate control of the valve than a spring return valve which has an inherent time delay for the working fluid to overcome the force of the spring when the valve is being opened. The four-way valve embodiment shown in FIG. 4, can also be used to move the valve 212 to an intermediate position between the open and closed positions.

Figure 11:
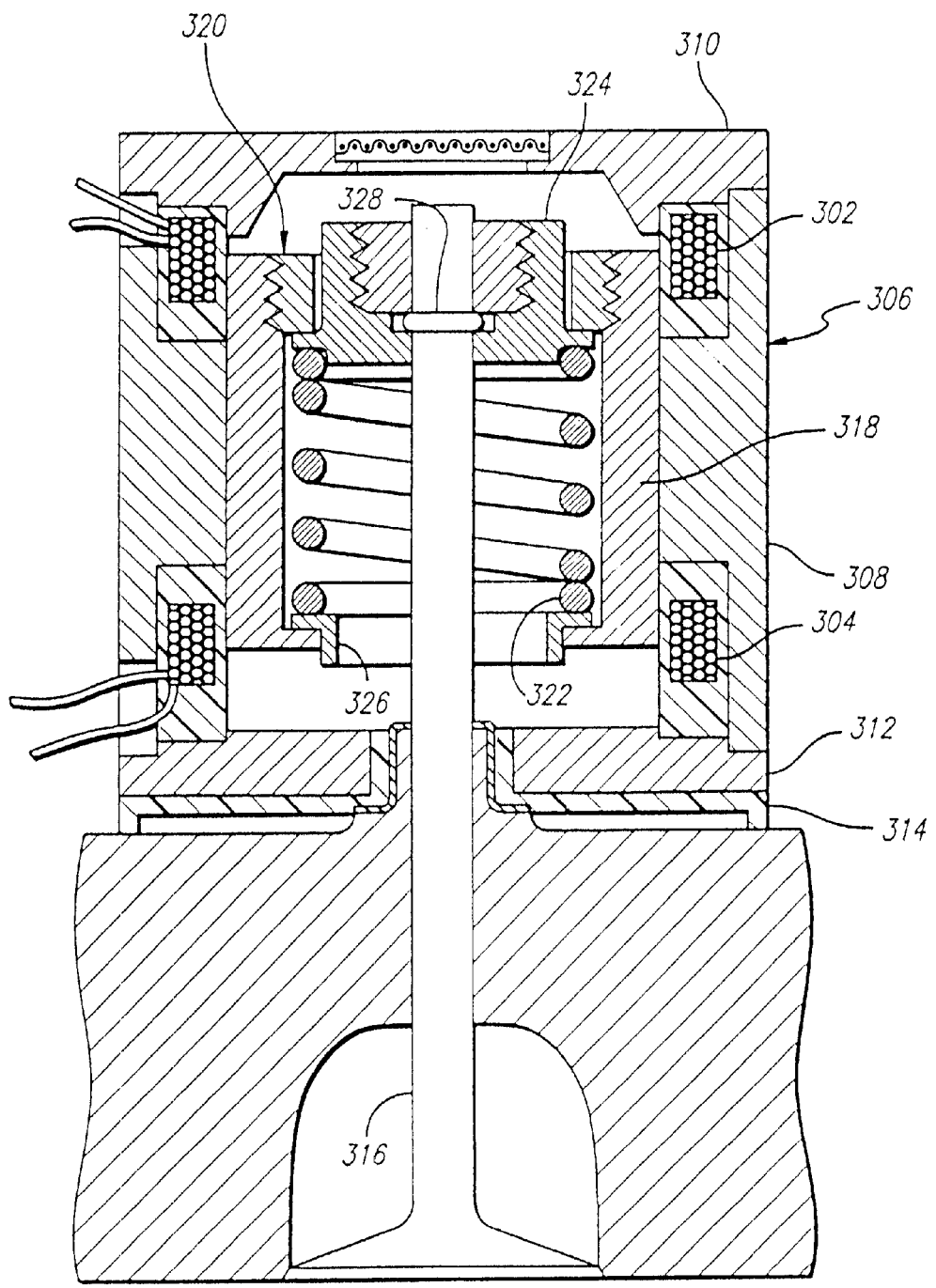
FIG. 11 is a side cross-sectional view of an alternate embodiment of an intake valve with a pair of digitally latched solenoids.

FIG. 11 shows another alternate embodiment of an intake valve 30 which has a pair of digitally latched solenoids. The valve has a first solenoid 302 and a second solenoid 304 that are each energized by a short duration digital pulse. The solenoids 302 and 304 are located within a housing 306 that has a main body 308 and a pair of end caps 310 and 312. The housing 306 also has a nonmagnetic base member 314.

The valve stem 316 is coupled to an armature 318 by a spring subassembly 320. The subassembly 320 contains a spring 322 that is captured by a pair of collars 324 and 326. The collars 324 and 326 are captured by the armature 318. Collar 324 is attached to the valve stem 316 by a clip 328. The armature 318, and end caps 310 and 312 are constructed from a magnetic material that has enough residual magnetism to maintain the position of the valve in either an open or closed position. The spring 322 can be deflected to allow the armature 318 to come into contact with the end caps.

In operation, the valve can be moved to the open position by actuating the second solenoid 304. The valve can be closed by actuating the first solenoid 302. In addition to allowing contact between the armature 318 and the end caps 310 and 312, the spring 322 also dampens the impact of the valve movement and provides stored energy to move the armature 318 away from the end caps.

Figure 12:
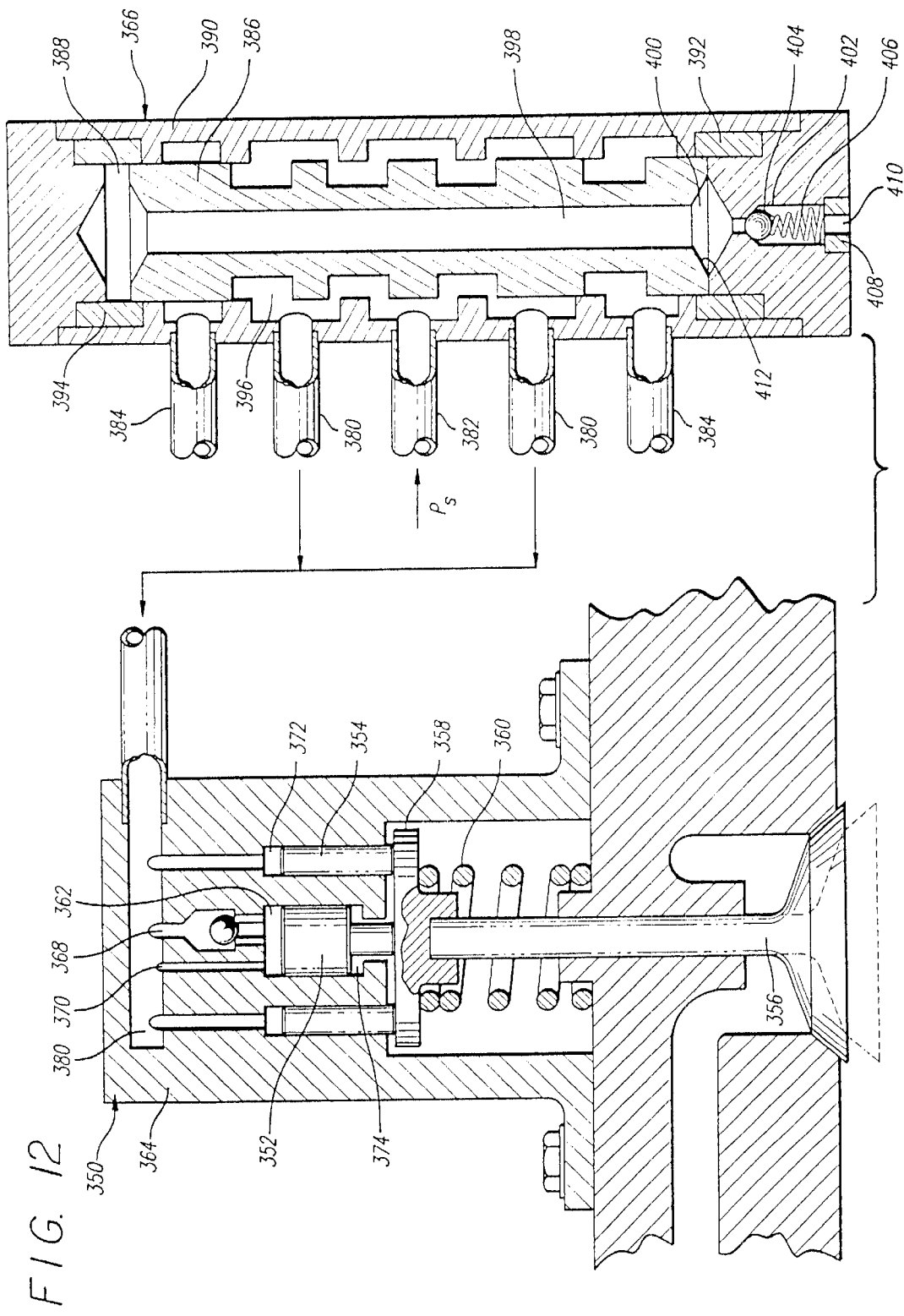
FIG. 12 is a side cross-sectional view of an alternate embodiment of an intake valve with a plurality of pins that open the valve.

FIG. 12 shows an alternate embodiment of a valve assembly 350. The assembly 350 includes a first pin 352 and a pair of second pins 354 that push a valve 356 into an open position. The pins 352 and 354 press against a valve collar 358 that is attached to said valve 356. The valve collar 358 captures a spring 360 that biases the valve 356 into a closed position. In the preferred embodiment, the first pin 352 has an area approximately four times larger than the combined area of the second pins 354.

The first pin 352 is located within a pressure chamber 362 of a valve housing 364. The pressure chamber 362 is in fluid communication with a control valve 366. Fluid communication between the pressure chamber 362 and the valve 366 may be provided by a one-way check valve 368 that allows flow into the chamber 362, and an orifice 370 that restricts the flow of fluid out of the pressure chamber 362. The second pins 354 are located within channels 372 that are in fluid communication with the control valve 366. The valve housing 364 has a stop 374 that limits the movement of the first pin 352 so that the valve 356 is initially opened by all of the pins 352 and 354, and then further opened only with the second pins 354.

The control valve 366 has a pair of cylinder ports 380 that are both coupled to the pressure chamber 362 and channels 372. The valve 366 also has a single supply port 382 that is coupled to a source of pressurized fluid and a pair of return ports 384 each coupled to a drain line. The valve 366 can be switched between a first position that couples the cylinder ports 380 to the supply port 382 to allow fluid to flow into the pressure chamber 362 and channels 372, and a second position that couples the cylinder ports 380 to the return ports 384 to allow fluid to flow out of the pressure chamber 362 and channels 372.

The valve 366 contains a spool 386 that moves within the inner chamber 388 of a housing 390. Within the housing 390 is a first solenoid 392 that can pull the spool 386 to the first position and a second solenoid 394 that can move the spool 386 to the second position. The solenoids 392 and 394 are connected to an external power source which can energize one of the solenoids to move the spool 386 to the desired position.

In the preferred embodiment, both the housing 390 and the spool 386 are constructed from a magnetic steel such as 440c or 52100. The hysteresis of the magnetic steel is such that the magnetic field within the spool 386 and the housing 390 will maintain the position of the spool 386 even when the solenoid is de-energized. The magnetic steel allows the valve to be operated in a digital manner, wherein one solenoid is energized for a predetermined time interval until the spool 386 is adjacent to an inner surface of the housing 390. Once the spool 386 has reached the new position, the solenoid is de-energized, wherein the hysteresis of the magnetic steel material maintains the position of the spool 386.

The spool 386 has outer grooves 396 that couple the cylinder ports 380 to either the supply port 382 or the return ports 384. The cylinder ports 380 are located on each side of the supply port 382 to dynamically balance the valve 366 when the spool 386 is moved from the first position to the second position. The fluid flowing through the cylinder ports has an associated resultant force that is applied to the spool 386. Placing the ports 380 on each side of the supply port 382 produces resultant fluid forces that are applied to the spool 386 in opposite directions. The opposing forces offset each other so that the fluid forces do not counteract the pulling force of the solenoid 392 on the spool 386. Likewise, the return ports 384 are located on each side of the cylinder ports 382 so that the resultant forces created by the fluid flowing through the return ports cancel each other, thereby preventing a counteracting force from impeding the pulling force of the solenoid 394. The port locations of the valve thus provide a fluid control valve that is dynamically pressure balanced. Balancing the spool 386 increases the response time of the valve and reduces the energy required by the solenoids to pull the spool 386 from one position to another.

The spool 386 has an inner channel 398 and a pair of end openings 400 that are in fluid communication with the inner chamber 388 of the housing 390. The end openings 400 and inner channel 398 allow fluid within the inner chamber 388 to flow away from the end of the spool 386, when the spool 386 is pulled to a new position. By way of example, when the second solenoid 394 pulls the spool 386 toward the housing 390, the fluid located between the end of the spool 386 and the housing 390 flows into the inner channel 398 through the end opening 400. The flow of fluid prevents a build-up of hydrostatic pressure which may counteract the pull of the solenoid. The inner channel 398 and end openings 400 thus statically pressure balance the spool 386.

The valve 366 may have a pressure relief valve 402 that releases fluid when the fluid pressure within the inner chamber 388 exceeds a predetermined value. The relief valve 402 may have a ball 404 that is biased into a closed position by a spring 406. The relief valve 402 may also have an insert 408 with an outlet port 410. The ends of the spool and the inner surface of the housing may have chamfered surfaces 412 to increase the volume of the inner chamber 388 between the spool 386 and the housing 390 and reduce the hydrostatic pressure within the valve 366.

In operation, a digital pulse is provided to the control valve 366 to switch the valve 366 and allow a pressurized working fluid to flow into the pressure chamber 362 and channels 372. The pressurized fluid exerts a force onto the pins 352 and 354 which push the valve 356 into the open position.

Figure 13:
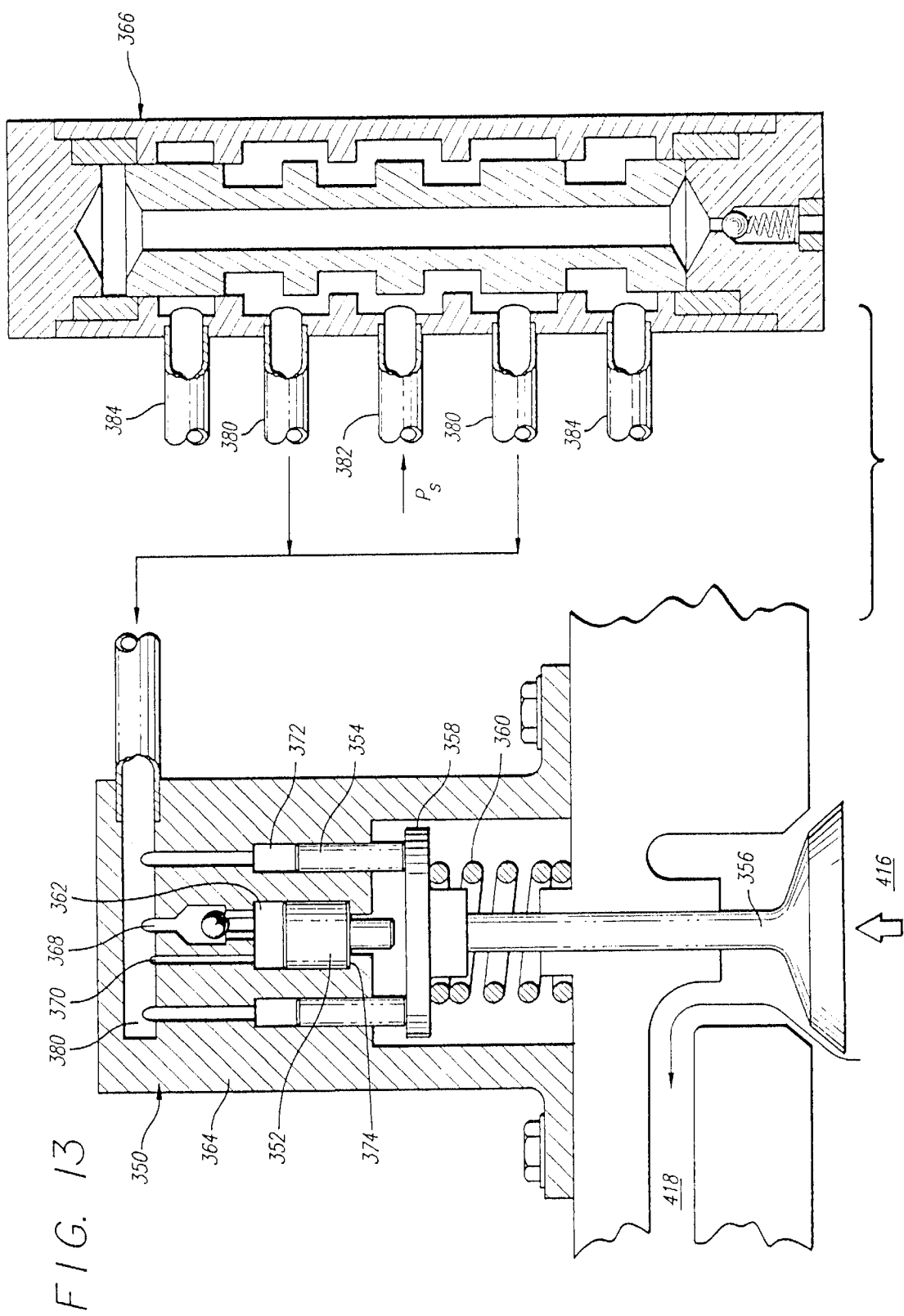
FIG. 13 is a cross-sectional view similar to FIG. 12, showing one of the pins engaging a stop.

As shown in FIG. 13, the stop 374 prevents further movement of the first pin 352 while the second pins 354 continue to push the valve 356 into the fully opened position. To close the valve 356, a digital pulse is provided to switch the control valve 366 to couple the pressure chamber 362 and channels 372 to drain. The force of the spring 360 pushes the valve back to the closed position. The orifice 370 restricts the flow of working fluid out of the pressure chamber 362 and reduces the speed of the valve 356 back to the closed position. The orifice 370 provides a damping function which prevents the valve 356 from "banging" against the valve seat. The damping of the valve reduces the wear and increases the life of the valve seat 414.

The dual pin valve assembly 350 is particularly desirable for use as an exhaust valve. During the exhaust stroke of an internal combustion engine the pressure within the combustion chamber 416 is relatively high. The work provided by the hydraulic fluid must be great enough to overcome the combustion chamber pressure and open the valve. When the valve 350 is initially opened, the exhaust gases within the combustion chamber flow out into the exhaust manifold 418. The flow of exhaust gas into the exhaust manifold 418 rapidly reduces the pressure within the combustion chamber 416. Because of the lower combustion chamber pressure and the momentum of the valve, the hydraulic fluid does not have to provide as much work to continue to open the valve 356.

The effective area and resulting forces provided by the hydraulic fluid onto the pins is reduced when the first pin 352 reaches the stop 374. Consequently the work provided by the hydraulic fluid is lowered after the valve 356 is initially opened. The valve assembly of the present invention thus reduces the work and increases the energy efficiency of the engine. Although each incremental reduction of work during one exhaust stroke is relatively small, when multiplied by the number of strokes during the operation of an engine the resultant increase in energy efficiency can be relatively significant.

Figure 14:
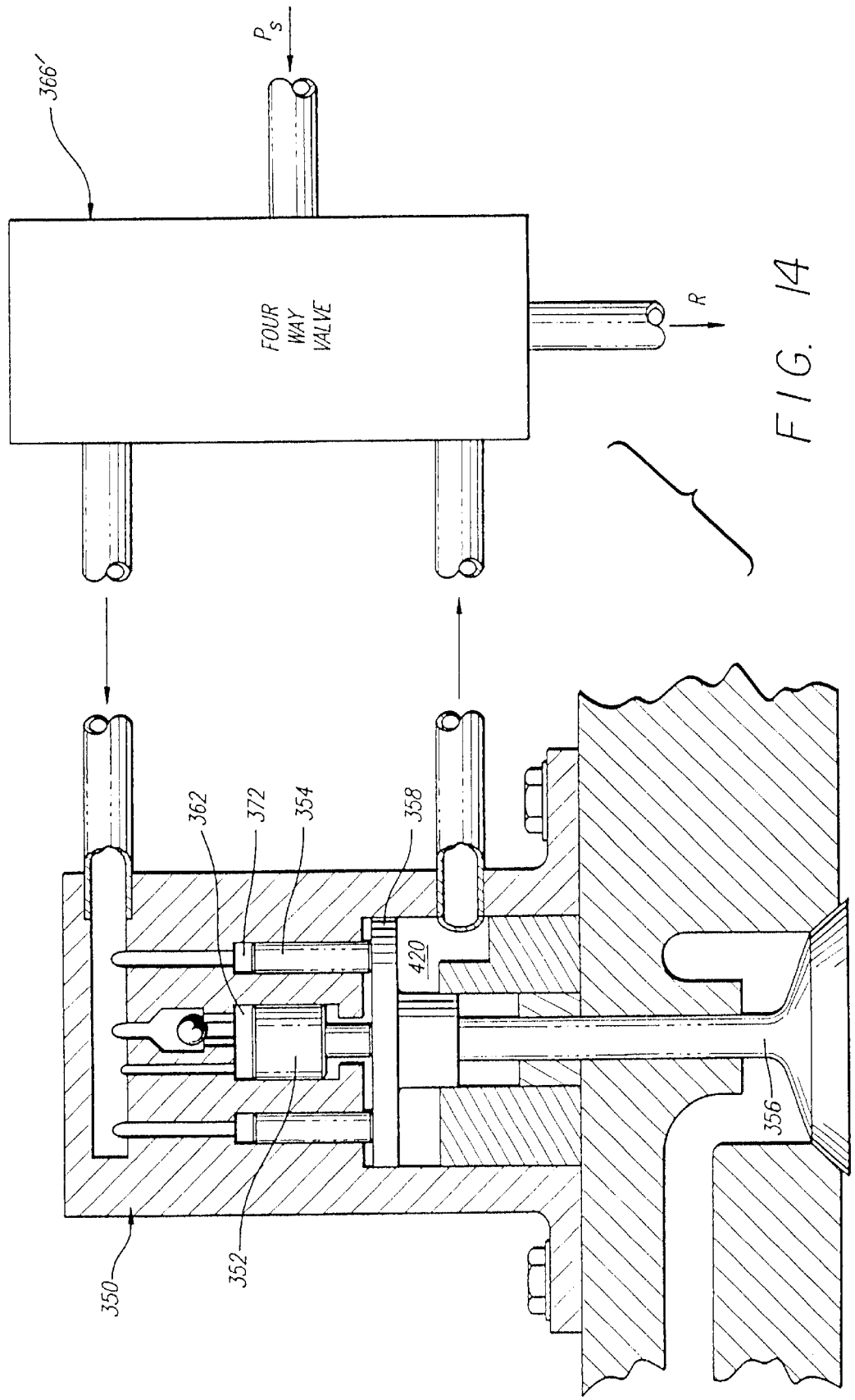
FIG. 14 is a side cross-sectional view of an alternate embodiment of the intake valve of FIG. 12, showing a four-way actuating valve.

FIG. 14 is an alternate embodiment of a valve assembly which has a four-way control valve 366'. The control valve 366' is connected to the pressure chamber 362 and channels 372, and a return chamber 420. The return chamber 420 receives pressurized working fluid that pushes the valve 356 back to the closed position. In operation, the valve 356 is switched to couple the pressure chamber 362 and channel 372 to the high pressure fluid, and the return chamber 420 to drain. The pressurized working fluid exerts a force on the pins 352 and 354 which move the valve 356 to the open position. The control valve 366' is then switched to connect the return chamber 420 to the pressurized working fluid, and the pressure chamber 362 and channels 372 to drain. The working fluid within the return chamber 420 pushes the valve 356 back to the closed position. The control valve '366 is preferably dynamically and statistically pressure balanced to increase the valve speed and reduce the energy consumed by the valve.

Figure 15:
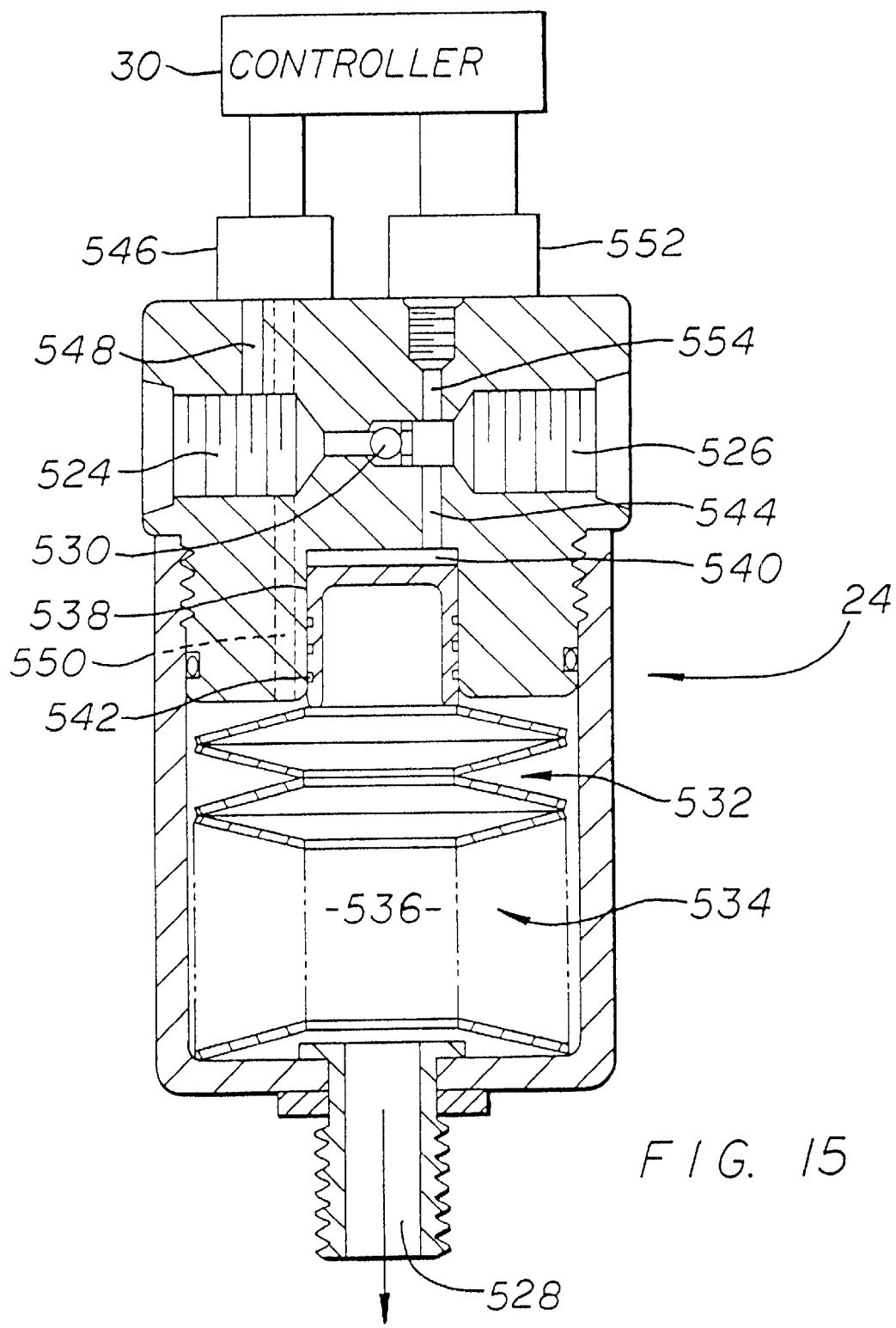
FIG. 15 is a cross-sectional view of the pump module.

As shown in FIG. 15, the pump module 24 includes a housing 522 which has an inlet port 524, an outlet port 526 and a return port 528. The module 24 typically has a one-way check valve 530 located between the inlet port 524 and the outlet port 526 to prevent a reverse flow of fluid into the inlet 24. The inlet port 24 is connected to the pump 514. The outlet port 524 is typically connected to the working device 518. The return port 528 is coupled to the reservoir 516. The housing 522 is typically constructed from two separate pieces to reduce the complexity and cost of manufacturing the unit.

The pump module 24 has a variable volume accumulator assembly 532 which maintains the fluid pressure at the outlet 526 of the module 24. The accumulator 532 contains a plurality of washer springs 534 stacked within a spring chamber 536 of the housing 522. The spring chamber 536 is in fluid communication with the return port 528 so that any fluid within the chamber 536 can flow to the reservoir 516. The spring washers 534 are coupled to a piston 538 that can move within an accumulator chamber 540. The piston 538 is typically sealed to the housing 522 by O-rings 542. A first regulator channel 544 couples the accumulator chamber 540 with the outlet port 526. The force of the springs 534 exerts a pressure on the fluid within the accumulator chamber 540 and the outlet port 526.

The module 24 also has a control valve 546 that is coupled to the inlet port 524 by a first valve channel 548 and to the spring chamber 536 by a second valve channel 550. The valve 546 is preferably a two-way solenoid valve that can switch between an open position and a closed position. When the valve 546 is in the open position the inlet port 524 is in fluid communication with the spring chamber 536 and the return port 528. The inlet port 524 is not in fluid communication with the spring chamber 536 when the control valve 546 is closed. The valve 546 is typically switched between the open and closed positions by the electronic controller 30. Opening the valve 546 directs the fluid from the pump 514 back to the reservoir 516, thereby bypassing the working device 518.

The module 24 further includes a pressure transducer 552 that is coupled to the outlet port 526 by a second regulator channel 554. The pressure transducer 552 provides a feedback signal that corresponds to the fluid pressure within the outlet port 526. The feedback signal is sent to the electronic controller 30. The controller 30 receives the feedback signal and compares the corresponding fluid pressure of the outlet port 526 with a threshold value. If the outlet port fluid pressure exceeds the threshold value, the controller 30 opens the control valve 546 and bypasses the fluid to the reservoir 516. The controller 30 is programmable so that the threshold value can be varied. For example, the controller 30 may receive system feedback signals relating to temperature and other system characteristics that are processed in accordance with an algorithm by the controller 30. The controller 30 may change the threshold value and corresponding system fluid pressure dependent upon the values of the characteristics. In this manner the controller 30 can change the pressure of the fluid within the system. Although a controller 30 is shown and described, it is to be understood that the pressure transducer 552 can be connected directly to the valve 546 without a controller 30.

In operation, the pump 514 pumps the fluid into the inlet port 24 of the module 24. The fluid passes through the check valve 30 and out of the outlet port 526 to the working device 518. The accumulator 532 will compensate for any variations on the load of the hydraulic system. For example, if the working device 518 is a fuel injector with a solenoid control valve, the injector will create a drop in pressure when the solenoid valve is opened. The accumulator 532 will compensate for the opening of the injector valve and maintain the fluid pressure within the system, so that there is not a reduction in fluid pressure when the next injector valve is opened.

It may be desirable to vary the pressure of the fluid to change the pressure of the fuel injected into the combustion chambers. The controller 30 can vary the system pressure by manipulating the control valve 546 and changing the output pressure of the module 24. What is thus provided is a pump module that can both control and vary the pressure of a fluid within an hydraulic system.

Figure 16:
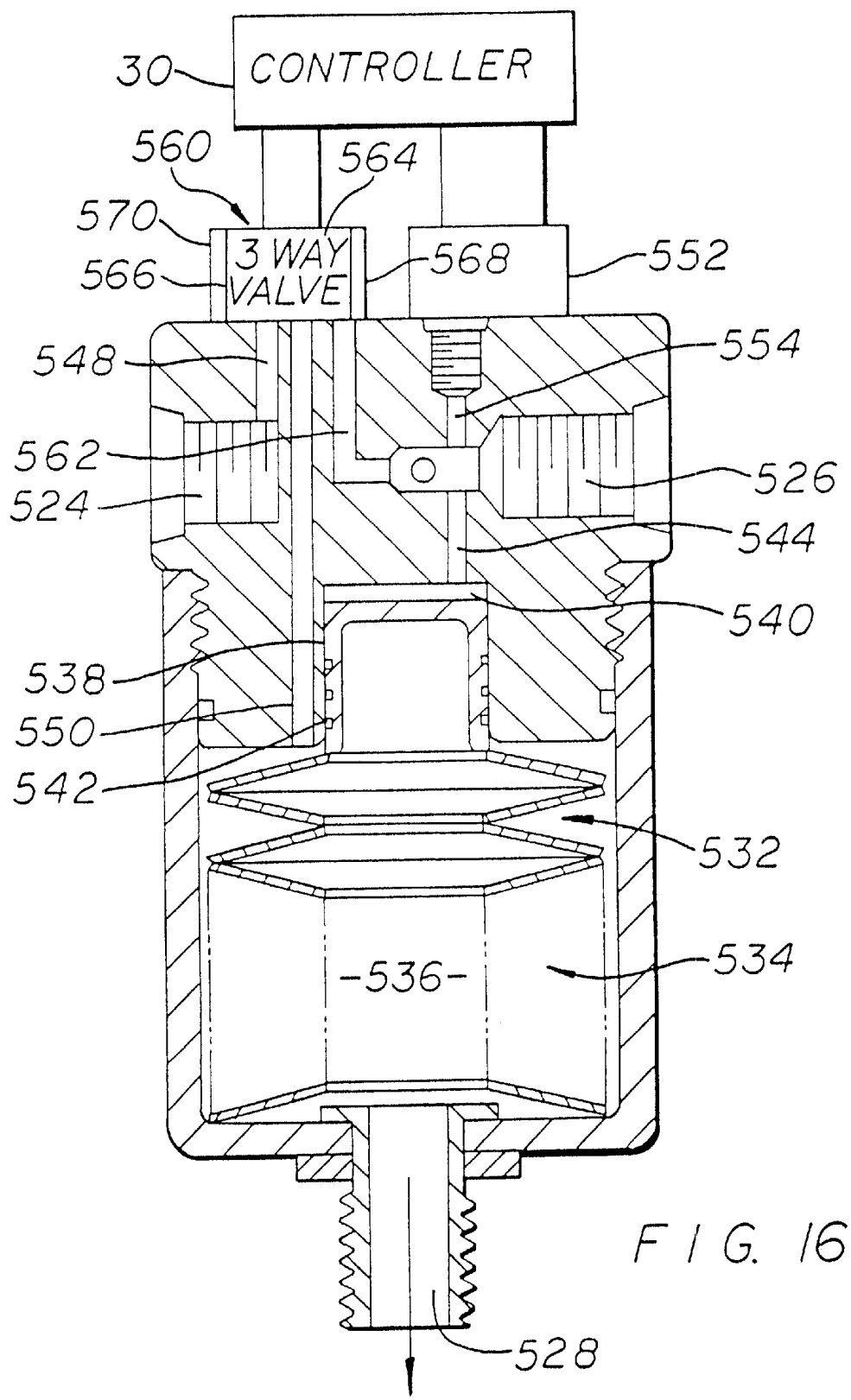
FIG. 16 is a cross-sectional view of an alternate embodiment of a pump module which has a three-way control valve.

FIG. 16 shows a preferred embodiment of a pump module which has a three-way control valve 560 connected to the controller 30. The control valve 560 is coupled to the inlet port 24 by channel 548, to spring chamber 536 by channel 550 and to outlet port 526 by channel 562.

The control valve 560 contains a spool 564 that is coupled to a first solenoid 566 and a second solenoid 568. The solenoids 566 and 568, and spool 564 are located within a valve housing 570. When the first solenoid 566 is energized, the spool 564 is moved to a first position, wherein the inlet port 524 is in fluid communication with the outlet port 526. When the second solenoid 568 is energized, the spool 564 is moved to a second position, wherein the inlet port 524 is in fluid communication with the spring chamber 536 and return port 528.

The solenoids 566 and 568 are energized by a short digital pulse from the controller 30. The spool 564 and housing 570 are preferably constructed from a magnetic material such as a 52100 or 440c hardened steel. The magnetic steel material has enough residual magnetism to maintain the position of the spool even when power to the solenoid has terminated. The valve therefore operates as a digital latch. It being understood that the two-way control valve 546 may also be a digitally latching valve.

In operation, the spool 564 is in the first position so that the output of the pump 514 is provided to the working devices 518. When the sensor 552 detects an excessive system pressure, the controller 30 provides a digital pulse to energize the second solenoid 568 and move the spool 564 to the second position. The output of the pump 514 is directed to the reservoir 516. Bypassing the output of the pump 512 to the reservoir 516 reduces the amount of work required by the pump 512.

Figure 17:
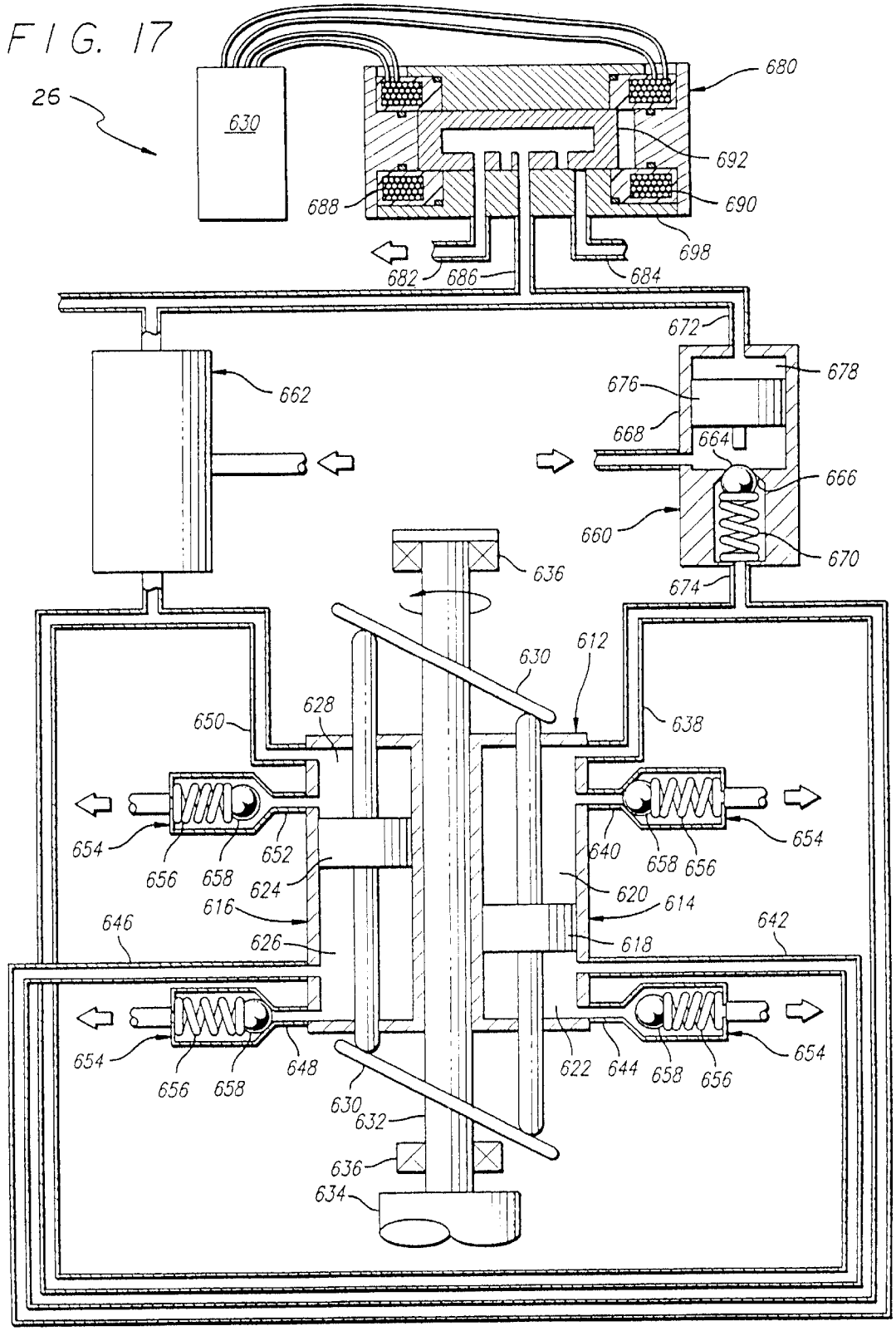
FIG. 17 is a schematic of a pump assembly of the present invention.

FIG. 17 shows a pump 26 of the present invention. In the preferred embodiment, the pump 26 is a positive displacement wobble plate device. Although a wobble plate pump is described and shown, it is to be understood that the present invention may be employed with other types of pumps.

The pump 26 has a housing 612 that contains a first chamber 614 and a second chamber 616. Located within the first chamber 614 is a first piston 618 that separates a first pump chamber 620 from a second pump chamber 622. Within the second chamber 616 is a second piston 624 that separates a third pump chamber 26 from a fourth pump chamber 628. The pistons 618 and 624 are reciprocated by a pair of wobble plates 630 that are attached to a rotating drive shaft 632. The drive shaft 632 typically extends from an electric motor 634 and is aligned by bearing assemblies 636.

The pump 26 has a first inlet port 638 and a first outlet port 640 coupled to the first pump chamber 620, a second inlet port 642 and a second outlet port 644 coupled to the second pump chamber 622, a third inlet port 646 and a third outlet port 648 coupled to a third pump chamber 624, and a fourth inlet port 650 and a fourth outlet port 652 coupled to the fourth pump chamber 628. The drive shaft 632 and wobble plates 630 reciprocate the pistons 618 and 624 between intake and exhaust strokes in an alternating pattern, wherein the first 620 and third 626 pump chambers are drawing in fluid when the second 622 and fourth 628 pump chambers are pumping out fluid, and vice versa. The pump chambers receive fluid from the inlet ports and pump out fluid through the outlet ports. Each outlet port has an outlet check valve 654 which contains a spring 656 that biases a ball-valve 658 to prevent a reverse flow of fluid into the pump chamber.

The first 638 and third 646 inlet ports are coupled to a first hydraulic check valve 660. The second 642 and fourth 650 inlet ports are coupled to a second hydraulic check valve 662. The check valves 660 and 662 control the flow of fluid into and out of the pump chambers. Each control valve contains a ball-valve 664 that is biased into a valve seat 666 of a housing 68 by a spring 670. The housing 670 has an inlet port 672 and an outlet port 674 that are in fluid communication with a source of fluid and a pump chamber, respectively.

The pistons 618 and 624 reciprocate through motions which expand and contract the pump chambers. Expanding the pump chambers decrease the pressure within the chambers. The differential pressure across each ball-valve 664 overcomes the force of the spring 670 and opens the check valve to allow fluid to flow into the chamber. When the volume of a pump chamber decreases the corresponding pressure increases and pushes the ball-valve closed, so that fluid only flows through the outlet valve.

Each check valve has a piston 676 that can move the ball-valve 664 to the open position. The piston 676 is driven by a working fluid in chamber 678. The pressure of the working fluid within the chamber 678 is controlled by a solenoid control valve 680. The solenoid control valve 680 is preferably a three-way valve with a first port 682 coupled to a high pressure source of fluid, a second port 684 coupled to a low pressure source of fluid and a third port 686 coupled to the chambers 678 of the check valves.

The control valve 680 has a first solenoid 688 and a second solenoid 690 that are coupled to a spool 692. Energizing a solenoid will pull the spool to one end of the valve. The solenoids and spool are located within a housing 698. The spool and housing are preferably constructed from a magnetic material such as a 52100 or 440c harden steel, so that the residual magnetism of the material will hold the spool in one of two positions even after the solenoids are de-energized.

The solenoids are coupled to a controller 30 which provides a plurality of digital pulses to the solenoids to move the spool. Energizing the first solenoid moves the spool to a first position to couple the second port to the first port. The first solenoid is energized for a short duration to pull the spool to the end of the housing. After the short duration pulse, power is terminated, wherein the residual magnetism of the material maintains the position of the spool. The second solenoid can then be energized by a digital pulse from the controller 30 to move the spool to a second position, wherein the first port is coupled to the third port and high pressure working fluid is introduced to the chambers 678 of the check valves.

As shown in FIG. 17, in operation, the wobble plates move the pistons to increase the first 620 and third 626 pump chambers, which draw fluid in through check valve 660. The second 622 and fourth 628 pump chambers pump fluid through the outlet ports. The check valve 662 remains closed to that the full volume of fluid within the second 622 and fourth 628 pump chambers is pumped into the outlet ports. Continued rotation of the wobble plates causes the pistons to pump fluid out of the first 620 and third 626 pump chambers and draw fluid into the second 622 and fourth 628 pump chambers.

Figure 18:
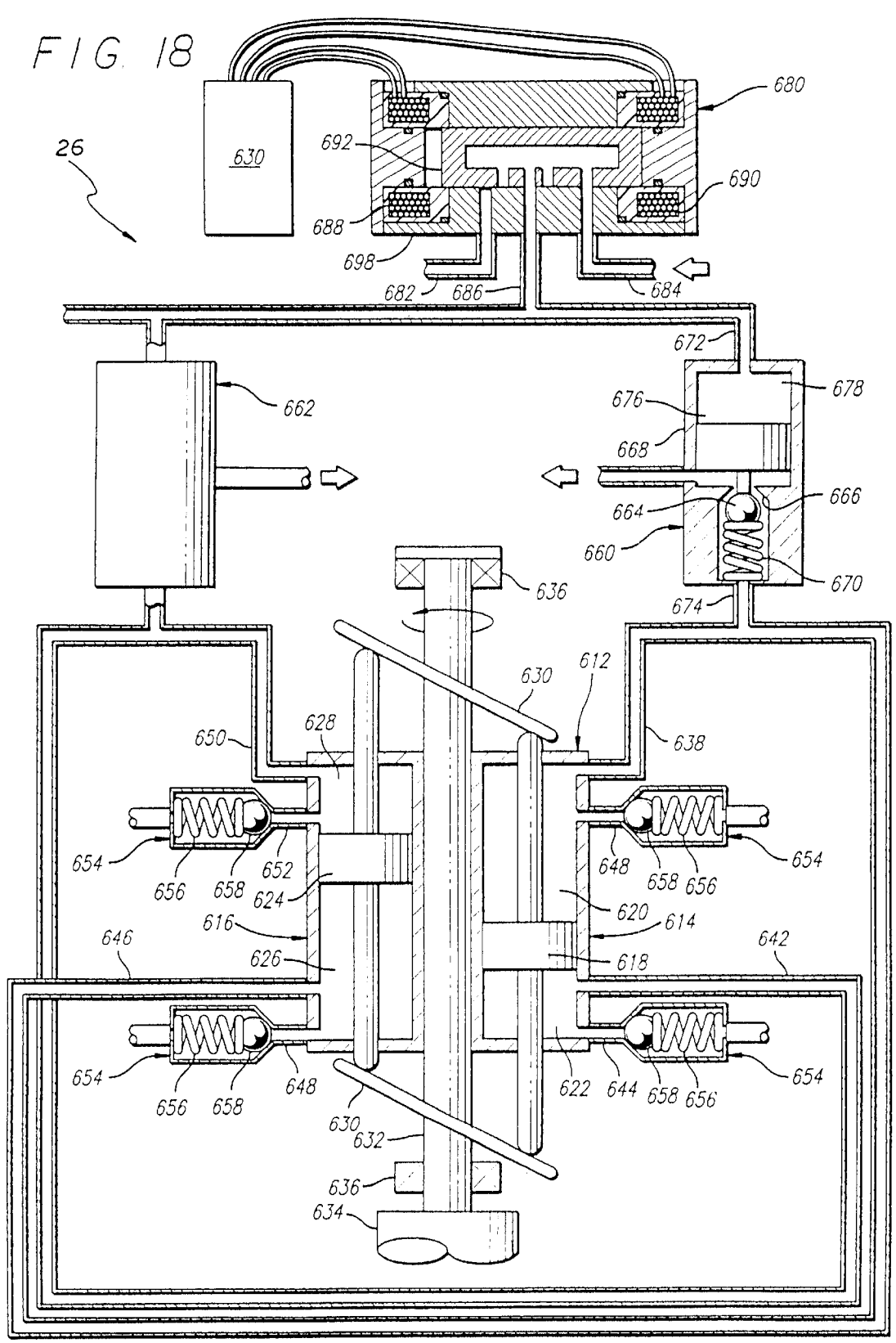
FIG. 18 is a schematic of the pump during a power stroke with the intake check valve open.

As shown in FIG. 18, the output pressure of the pump can be controlled by energizing the second solenoid 690 of the control valves 680 so that working fluid flows into the check valve chambers 678 and cause the pistons 676 to open the ball-valves 664. The opened check valves allow the output fluid of the pump chambers to flow back through the inlet ports into the low pressure line of the system. The pistons may maintain the intake check valves in the open position until the system pressure has reached a desired pressure. To this end the controller 30 can be coupled to a pressure sensor which senses the fluid pressure of the system and provides feedback signals to the controller. The controller can regulate the output of the pump in response to the feedback signals. The hydraulically controlled intake valve provide a fluid by-pass without requiring the pump to expend additional energy during the by-pass cycle of the pump.

It may be desirable to vary the pressure of the fluid to change the pressure of the fuel injected into the combustion chambers. The controller 620 can vary the system pressure by manipulating the control valve 646 and changing the output pressure of the module 26. What is thus provided is a pump module that can both control and vary the pressure of a fluid within an hydraulic system.

Referring to FIG. 1, during the intake stroke of the engine piston, the controller provides a digital pulse to the first control valve 18 to open the intake valve and allow air to flow into the combustion chamber. After a predetermined time interval the controller 30 provides a second digital pulse to close the intake valve. The controller 30 then provides a digital pulse to the third control valve 22 to move the intensifier and fill the pressure chamber with fuel. When the engine piston reaches the top dead center position of the compression stroke, the controller provide a digital signal to the first solenoid of the control valve to eject a pressurized spray of fuel into the combustion chamber. After a predetermined time interval, the controller provides digital pulses to open and close the exhaust valve.

The sensors for the valves and fuel injector provide feedback to the controller so that the controller can change the timing of digital pulses. For example, because of component wear, a valve may open at a slower rate. The controller can compensate for this event by providing the digital signal to open the valve at an earlier time during the combustion cycle. Additionally, changes in engine temperature may change the fuel viscosity and the pressure within the system. The controller can provide digital pulses to the control valves of the pump and/or accumulator to change the system fluid pressure. The camless electronically controlled engine is thus capable of accurately changing and controlling the operation of the engine.

The camless electronic fuel system of the present invention is also capable of providing different operating modes. For example, when decelerating a vehicle it is desirable to brake the engine. A common method of braking an engine is to allow the pistons to compress air within the engine cylinders during the power stroke. When the controller senses a deceleration, the controller can go through a braking routine of initially providing digital signals to open and close the intake valve during the intake stroke of the piston. In the braking mode, the controller will not provide digital signals to eject fuel at the top dead center of the compression stroke. During the exhaust stroke of the engine, the controller provides digital signals to slightly open the exhaust valve. Although a braking mode is described, it is to be understood that other modes may be implemented by the fuel system of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A valve assembly adapted for an internal combustion engine, comprising:

a valve housing having a pressure chamber;

a piston separating the pressure chamber into a first subchamber and a second subchamber;

a first port coupled the first subchamber;

a second port coupled to the second subchamber;

a valve coupled to the piston and moveable between an open position and a closed position; and an orifice connected between the first port and the first subchamber, the orifice operable to restrict a flow of fluid from the pressure chamber as the valve moves to the closed position;

wherein the valve is moved from the closed position to the open position by supplying a high pressure working fluid to the first port and coupling the second port to a drain, and the valve is moved from the open position to the closed position by supplying the high pressure working fluid to the second port and coupling the first port to the drain.

2. The valve assembly of claim 1, further comprising a fluid control valve coupled to the first port and the second port, the fluid control valve having a supply port for receiving the high pressure working fluid and a return port adapted to be coupled to the drain, the fluid control valve having a first position wherein the supply port is coupled to the first port and the return port is coupled to the second port, and the fluid control valve having a second position wherein the supply port is coupled to the second port and the return port is coupled to the first port.

3. The valve assembly of claim 2, further comprising a first electrical actuator adapted to be energized to move the fluid control valve toward the first position, and a second electrical actuator adapted to be energized to move the fluid control valve toward the second position.

4. The valve assembly of claim 1, further comprising a one-way check valve coupled between the first port and the first subchamber, the one-way check valve moveable to a closed position as the valve moves to the closed position.

5. The valve assembly of claim 1, further comprising a first pin and a second pin coupled between the first subchamber and the piston, the first pin and the second pin operable to move the valve to the open position, and a stop operable to limit movement of the first pin such that the valve is initially opened by the first and second pins and then further opened only by the second pin.

6. The valve assembly as recited in claim 5, wherein the first pin has a larger effective area than an effective area of the second pin.

7. A valve assembly adapted for an internal combustion engine, comprising:
   a valve housing;
   a first port coupled the valve housing;
   a second port coupled to the valve housing;
   a valve moveable between an open position and a closed position;
   a valve opening means coupled to the valve and the valve housing for moving the valve from the closed position to the open position by supplying a high pressure working fluid to the first port and coupling the second port to a drain;
   a valve closing means coupled to the valve and the valve housing for moving the valve from the open position to the closed position by supplying the high pressure working fluid to the second port and coupling the first port to the drain; and
   a restricting means for restricting the flow of the high pressure working fluid to the drain when the valve moves from the open position to the closed position.

8. The valve assembly of claim 7, further comprising a fluid control means coupled to the first port and the second port for receiving the high pressure working fluid and coupling to the drain, the fluid control means having a first position wherein the supply port is coupled to the first port and the return port is coupled to the second port, and the fluid control means having a second position wherein the supply port is coupled to the second port and the return port is coupled to the first port.

9. The valve assembly of claim 8, further comprising a first electrical actuator means coupled to the fluid control means for moving the fluid control means toward the first position when energized, and a second electrical actuator means for moving the fluid control valve toward the second position when energized.

10. The valve assembly of claim 7, further comprising a first valve opening means for opening the valve, a second valve opening means for opening the valve, and a stop means for limiting movement of the first valve opening means such that the valve is initially opened by the first and second valve opening means and then further opened only by the second valve opening means.

11. The valve assembly as recited in claim 10, wherein the first valve opening means creates a larger opening force than the second valve opening means.

12. The valve assembly of claim 9, wherein the first electrical actuator means is further for latching the fluid control means to the first position when energized by a first digital pulse, and the second electrical actuator means is further for latching the fluid control valve to the second position when energized by a second digital pulse.

13. The valve assembly of claim 3, wherein the first electrical actuator is adapted to be energized by a first digital pulse to latch the fluid control valve to the first position, and the second electrical actuator is adapted to be energized by a second digital pulse to latch the fluid control valve to the second position.

14. The valve assembly of claim 3, wherein the valve is an engine valve.

15. A valve assembly adapted for an internal combustion engine, comprising:
   a valve housing having a pressure chamber;
   a piston separating the pressure chamber into a first subchamber and a second subchamber;
   a first port coupled the first subchamber;
   a second port coupled to the second subchamber;
   a valve coupled to the piston and moveable between an open position and a closed position; and
   a one-way check valve coupled between the first port and the first subchamber, the one-way check valve moveable to a closed position as the valve moves to the closed position;
   wherein the valve is moved from the closed position to the open position by supplying a high pressure working fluid to the first port and coupling the second port to a drain, and the valve is moved from the open position to the closed position by supplying the high pressure working fluid to the second port and coupling the first port to the drain.

16. The valve assembly of claim 15, further comprising a fluid control valve coupled to the first port and the second port, the fluid control valve having a supply port for receiving the high pressure working fluid and a return port adapted to be coupled to the drain, the fluid control valve having a first position wherein the supply port is coupled to the first port and the return port is coupled to the second port, and the fluid control valve having a second position wherein the supply port is coupled to the second port and the return port is coupled to the first port.

17. The valve assembly of claim 16, further comprising a first electrical actuator adapted to be energized to move the fluid control valve toward the first position, and a second electrical actuator adapted to be energized to move the fluid control valve toward the second position.

18. The valve assembly of claim 17, wherein the first electrical actuator is adapted to be energized by a first digital pulse to latch the fluid control valve to the first position, and the second electrical actuator is adapted to be energized by a second digital pulse to latch the fluid control valve to the second position.

19. The valve assembly of claim 15, further comprising a first pin and a second pin coupled between the first subchamber and the piston, the first pin and the second pin operable to move the valve to the open position, and a stop operable to limit movement of the first pin such that the valve is initially opened by the first and second pins and then further opened only by the second pin.

20. The valve assembly as recited in claim 19, wherein the first pin has a larger effective area than an effective area of the second pin.

21. The valve assembly as recited in claim 15, wherein the valve housing has an orifice connected between the first port and the first subchamber, the orifice operable to restrict a flow of fluid from the pressure chamber as the valve moves to the closed position.

22. The valve assembly of claim 15, wherein the valve is an engine valve.

23. A valve assembly adapted for an internal combustion engine, comprising:
   a valve housing having a pressure chamber;
   a piston separating the pressure chamber into a first subchamber and a second subchamber;
   a first port coupled the first subchamber;

a second port coupled to the second subchamber;

a valve coupled to the piston and moveable between an open position and a closed position;

a first pin coupled between the first subchamber and the piston, the first pin operable to move the valve to the open position;

a second pin coupled between the first subchamber and the piston, the second pin operable to move the valve to the open position; and a stop operable to limit movement of the first pin such that the valve is initially opened by the first and second pins and then further opened only by the second pin;

wherein the valve is moved from the closed position to the open position by supplying a high pressure working fluid to the first port and coupling the second port to a drain, and the valve is moved from the open position to the closed position by supplying the high pressure working fluid to the second port and coupling the first port to the drain.

24. The valve assembly of claim 23, further comprising a fluid control valve coupled to the first port and the second port, the fluid control valve having a supply port for receiving the high pressure working fluid and a return port adapted to be coupled to the drain, the fluid control valve having a first position wherein the supply port is coupled to the first port and the return port is coupled to the second port, and the fluid control valve having a second position wherein the supply port is coupled to the second port and the return port is coupled to the first port.

25. The valve assembly of claim 24, further comprising a first electrical actuator adapted to be energized to move the fluid control valve toward the first position, and a second electrical actuator adapted to be energized to move the fluid control valve toward the second position.

26. The valve assembly of claim 25, wherein the first electrical actuator is adapted to be energized by a first digital pulse to latch the fluid control valve to the first position, and the second electrical actuator is adapted to be energized by a second digital pulse to latch the fluid control valve to the second position.

27. The valve assembly of claim 23, further comprising a one-way check valve coupled between the first port and the first subchamber, the one-way check valve moveable to a closed position as the valve moves to the closed position.

28. The valve assembly as recited in claim 23, wherein the first pin has a larger effective area than an effective area of the second pin.

29. The valve assembly as recited in claim 23, wherein the valve housing has an orifice connected between the first port and the first subchamber, the orifice operable to restrict a flow of fluid from the pressure chamber as the valve moves to the closed position.

30. The valve assembly of claim 23, wherein the valve is an engine valve.

* * * * *